US010289954B2

(12) United States Patent
Li et al.

(10) Patent No.: US 10,289,954 B2
(45) Date of Patent: May 14, 2019

(54) POWER DISTRIBUTION TRANSFORMER LOAD PREDICTION ANALYSIS SYSTEM

(71) Applicant: Accenture Global Services Limited, Dublin (IE)

(72) Inventors: Ming Li, Beijing (CN); Qin Zhou, Beijing (CN); Zhihui Yang, Beijing (CN); Ming Ye, Ghungzhou (CN); Long He, Shanghai (CN); Guang Lin, Shanghai (CN)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 1044 days.

(21) Appl. No.: 14/440,777

(22) PCT Filed: Jan. 6, 2015

(86) PCT No.: PCT/CN2015/070239

§ 371 (c)(1),
(2) Date: May 5, 2015

(87) PCT Pub. No.: WO2016/109946

PCT Pub. Date: Jul. 14, 2016

(65) Prior Publication Data

US 2017/0011297 A1 Jan. 12, 2017
US 2019/0042954 A2 Feb. 7, 2019

(51) Int. Cl.
*G06F 17/00* (2019.01)
*G06N 5/04* (2006.01)
(Continued)

(52) U.S. Cl.
CPC ............. *G06N 5/04* (2013.01); *G06F 16/258* (2019.01); *G06N 20/00* (2019.01); *H02H 3/006* (2013.01);
(Continued)

(58) Field of Classification Search
CPC .. G06F 17/30569; G06N 5/04; G06N 99/005; H02H 3/006; H02H 7/04; H02J 13/001;
(Continued)

(56) References Cited

U.S. PATENT DOCUMENTS

2005/0090995 A1 4/2005 Sonderegger
2005/0096772 A1 5/2005 Cox et al.
2013/0013232 A1 1/2013 Parwal et al.

FOREIGN PATENT DOCUMENTS

CN 102270279 A 12/2011
CN 102855385 A 1/2013
(Continued)

OTHER PUBLICATIONS

International Preliminary Report on Patentability, dated Jul. 20, 2017, pp. 1-5, issued in International Patent Application No. PCT/CN2015/070239, The International Bureau of WIPO, Geneva, Switzerland.

(Continued)

*Primary Examiner* — Luis A Sitiriche
(74) *Attorney, Agent, or Firm* — Brinks Gilson & Lione

(57) ABSTRACT

A system can generate a heavy load pre-warning or an overload pre-warning for distribution transformers. Operation of the system can include selecting data records received from a plurality of data sources; converting the data records in the plurality of different data formats; filtering the data records in the database by using a predetermined threshold and matching each of the filtered data records with one of a plurality of distribution transformers; transforming the matched data records to a plurality of predefined predictor variables; selecting a subset of the plurality of predefined predictor variables; training, testing and tuning a model and forecasting at least one of heavy load or overload for each of the plurality of distribution transformers in a predetermined region.

20 Claims, 19 Drawing Sheets

(51) Int. Cl.

| | |
|---|---|
| ***G06N 20/00*** | (2019.01) |
| ***G06F 16/25*** | (2019.01) |
| ***H02J 3/00*** | (2006.01) |
| ***H02J 13/00*** | (2006.01) |
| ***H02H 3/00*** | (2006.01) |
| ***H02H 7/04*** | (2006.01) |

(52) U.S. Cl.

CPC ................. *H02H 7/04* (2013.01); *H02J 3/00* (2013.01); *H02J 13/001* (2013.01); *H02J 2003/003* (2013.01); *H02J 2003/007* (2013.01); *Y02E 60/725* (2013.01); *Y02E 60/74* (2013.01); *Y02E 60/76* (2013.01); *Y04S 10/20* (2013.01); *Y04S 10/30* (2013.01); *Y04S 10/40* (2013.01); *Y04S 40/22* (2013.01)

(58) Field of Classification Search

CPC .. H02J 2003/003; H02J 2003/007; H02J 3/00; Y02E 60/725; Y02E 60/74; Y02E 60/76; Y04S 10/20; Y04S 10/30; Y04S 10/40; Y04S 10/54; Y04S 40/22

See application file for complete search history.

(56) References Cited

FOREIGN PATENT DOCUMENTS

| | | | |
|---|---|---|---|
| CN | 103136598 | A | 6/2013 |
| CN | 103559556 | A | 2/2014 |
| KR | 10-2010-0018476 | | 2/2010 |
| WO | WO 2014/078830 | A2 | 5/2014 |
| WO | WO 2014/086226 | A1 | 6/2014 |

OTHER PUBLICATIONS

Examination Report, dated Aug. 2, 2017, pp. 1-4, issued in European Patent Application No. 16 150 350.0-1804, Munich, Germany.

International Search Report and Written Opinion, dated Sep. 25, 2015, pp. 1-8, issued in International Patent Application No. PCT/CN2015/070239, State Intellectual Property Office of the P.R. China, Beijing, China.

Australian Examination Report, dated Oct. 7, 2016, pp. 1-7, Australian Patent Office, Australian Application No. 2015282362, Hartwell, Australia.

European Search Report, dated May 19, 2016, pp. 1-10, European Patent Office, European Application No. 16150350.3, Munich, Germany.

610 → Transformer Load Data – 96 points per day per transformer

| TRANS_ID | CAPACITY | DATA_DATE | P1 | P2 | P3 | P4 | ... | ... | P95 | P96 |
|---|---|---|---|---|---|---|---|---|---|---|
| T00006688 | 315 | 9/11/2012 | 67.4 | 55 | 51 | 37.5 | ... | ... | 73 | 75.3 |
| T00006688 | 315 | 9/12/2012 | 78.2 | 51.1 | 45.4 | 44.2 | ... | ... | 94.3 | 76.9 |
| T00006688 | 315 | 9/13/2012 | 60.8 | NA | 50.2 | 48.6 | ... | ... | 81.3 | 71.9 |
| ... | ... | ... | ... | ... | ... | ... | ... | ... | ... | ... |

640

620 → Weather Data – daily max/min temperature, weather type

| DATE | Min(°C) | Max(°C) | Weather | 1:00 | 2:00 | ... | 23:00 | 0:00 |
|---|---|---|---|---|---|---|---|---|
| 9/11/2012 | 24.7 | 30.9 | rain | 27.1 | 26 | ... | 24.7 | 24.8 |
| 9/12/2012 | 25.4 | 31.2 | rain | 26.8 | 26.7 | ... | 25.7 | 25.4 |
| 9/13/2012 | 26 | 32.2 | cloudy | 26.8 | 26.2 | ... | 26.3 | 26 |
| ... | ... | ... | ... | ... | ... | ... | ... | ... |

630 → User Data – user type and electricity usage

| USER_ID | TRANS_ID | ELEC_TYPE | STATUS | 201201 | 201202 | 201203 | ... |
|---|---|---|---|---|---|---|---|
| U6747552403 | T00006688 | Commercial | Normal | 8297 | 9994 | 9132 | ... |
| U6754782842 | T00006688 | Residential | Normal | 258 | 308 | 338 | ... |
| U6755620304 | T00006688 | Residential | Normal | 144 | 138 | 125 | ... |
| ... | ... | ... | ... | ... | ... | ... | ... |

FIG. 6

An example of transformer load data checking

Transformer Load Data

| TRANS_ID | CAPACITY 710 | DATA_DATE | P1 | P2 720 |
|---|---|---|---|---|
| T00006688 | 315 | 9/11/2012 | 67.4 | NA |
| T00006688 | 315 | 9/12/2012 | 78.2 | 51.1 |
| T00006689 | 0 | 9/13/2012 | 60.8 | NA |
| ... | ... | ... | ... | ... |

FIG. 7

An example of matching load data and user data

Load data for the same transformer on Multiple dates

Transformer Load Data 810

| TRANS_ID | CAPACITY | DATA_DATE | P1 | P2 |
|---|---|---|---|---|
| T00006688 | 315 | 9/11/2012 | 67.4 | 55 |
| T00006688 | 315 | 9/12/2012 | 78.2 | 51.1 |
| T00006688 | 315 | 9/13/2012 | 60.8 | NA |
| ... | ... | ... | ... | ... |

Multiple user data for the same transformer

User Data 820

| USER_ID | TRANS_ID | ELEC_TYPE | STATUS |
|---|---|---|---|
| U6747552403 | T00006688 | Commercial | Normal |
| U6754782842 | T00006688 | Residential | Normal |
| U6755620304 | T00006688 | Residential | Normal |
| ... | ... | ... | ... |

FIG. 8

Model fitting and tuning procedure

POWER DISTRIBUTION TRANSFORMER LOAD PREDICTION ANALYSIS SYSTEM

CROSS-REFERENCE TO RELATED APPLICATIONS

This application is a continuation of International Application No. PCT/CN2015/070239, filed on Jan. 6, 2015, which is hereby incorporated herein by reference in its entireties.

FIELD OF THE TECHNOLOGY

The disclosure relates to the field of heavy load/overload forecasts for distribution transformers, and more particularly, it relates to a method, a device and a system for providing heavy load/overload pre-warnings for distribution transformers.

BACKGROUND OF THE TECHNOLOGY

A distribution transformer is one type of transformer that can provide the final voltage transformation in the electric power distribution system. The distribution transformer changes the primary voltage received to a secondary voltage that can be used by customers of an electric utility system.

In areas with rapid economic growth, distribution transformer heavy load and overload occur frequently. The utility companies use the heavy load and overload prediction analysis to re-allocate the network resources, protect the network assets and reduce customer complaints. However, current load forecasting methods are not suitable for handling the large amount of distribution transformers with a high volume of load data and high variety of loading patterns. Particularly, the existing forecasting methods are not developed for providing the heavy load/overload pre-warnings for both short-term and mid-term forecast by utilizing the high volume of data from multiple sources. As such, the generation of pre-warnings by using the high volume of data from multiple sources for a large number of distribution transformers with a high variety of loading patterns is needed.

SUMMARY

Examples of the present disclosure provide at least a method, a device and a system for providing heavy load/overload pre-warnings for distribution transformers. Some of examples of the present disclosure may be provided as follows:

A method for providing a heavy load pre-warning or an overload pre-warning for distribution transformers may be provided as an example. The method may include: selecting data records received from a plurality of data sources, the data records including electric power usage related information, where at least some of the data records are in a plurality of different data formats; and converting the data records in the plurality of different data formats into a predefined data format and populating a database with the converted data records.

The method may also include: filtering the data records in the database by using a predetermined criterion and matching each of the filtered data records with one of a plurality of distribution transformers; transforming the matched data records to a plurality of predictor variables calculating values of the predictor variables from the matched data records according to a set of pre-designed methods, where the plurality of predefined predictor variables are designed to reduce a data record volume.

The method may further include: selecting a subset of the plurality of predefined predictor variables, where the predictor variables are selected according to a correlation test result; training, testing and tuning a model based on the selected subset of predictor variables and a subset of matched data records; forecasting at least one of heavy load or overload for each of the plurality of distribution transformers in a predetermined region based on the model for providing a heavy load pre-warning and/or an overload pre-warning for each of the distribution transformers in the predetermined region; and displaying the forecasted heavy load or overload for the plurality of distribution transformers in a user interface for upgrading the distribution transformers and/or generating a system alert for the distribution transformers.

A device to provide a heavy load pre-warning or an overload pre-warning for distribution transformers may also be provided as an example of the present disclosure. The device may include: a processor; a transceiver in communication with the processor, and a computable readable medium and a database. The transceiver may be configured to receive data records from a plurality of data feeds, the data records comprising electric power usage related information, where at least some of the data records are in a plurality of different data formats. The database may be stored in a non-transitory computable readable medium in communication with the processor. The processor may be configured to convert the data records in the plurality of different data formats into a pre-defined data format and populate the database with the converted data records with the predefined data format.

The processor of the device may further be configured to: filter the data records in the database by using a predetermined condition, and associate each of the converted data records with one of a plurality of distribution transformers; transform the associated data records to a plurality of predefined predictor variables by calculating values of the predictor variables from the matched data records according to a set of pre-designed methods, wherein the plurality of predefined predictor variables are designed to reduce a data record volume; and select a subset of the plurality of predefined predictor variables, wherein the predictor variables in the selected subset are selected according to a correlation test result.

The processor of the device may further be configured to: train, test and tune a model based on the selected subset of variables and a subset of matched data records; forecast at least one of heavy load or overload for each of the plurality of distribution transformers in a predetermined region based on the model for providing the heavy load pre-warning or the overload pre-warning for the distribution transformers in the predetermined region and display the forecasted heavy load or overload for the plurality of distribution transformers in a user interface for upgrading the distribution transformers and/or generating a system alert for the distribution transformers.

A system for providing a heavy load pre-warning or an overload pre-warning for distribution transformers may be provided as additional example of the present disclosure. The system may include: at least one processor, a computer readable medium which is other than transitory, and instructions stored in the computer readable medium. The system may have instructions that are executable by the at least one processor that may cause the system to: receive data records from a plurality of data feeds, the data records comprising electric power usage related information, where at least some of the data records are in a plurality of different data layouts.

The system may include instructions that are executable by the at least one processor and cause the system to: convert the data records in the plurality of different data layouts into a pre-defined data layout and populate a database with the converted data records; filter the data records in the database by using a predetermined condition and associate each of the converted data records with one of a plurality of distribution transformers; and transform the associated data records to a plurality of predefined predictor variables calculating values of the predictor variables from the matched data records according to a set of pre-designed methods, where the plurality of predefined predictor variables are designed to decrease a data record volume.

Further, the system may have instructions that are executable by the at least one processor that may cause the system to: select a subset of the plurality of predefined predictor variables, where the predictor variables in the selected subset may be selected according to a correlation test result; train, test and tune a model based on the selected subset of variables and a subset of matched data records; forecast at least one of heavy load or overload for each of the plurality of distribution transformers in a predetermined geographic region based on the model for providing the heavy load pre-warning or the overload pre-warning for the distribution transformers in the predetermined geographic region; and display the forecasted heavy load or overload for the plurality of distribution transformers in a user interface for upgrading the distribution transformers or generating a system alert for the distribution transformers.

BRIEF DESCRIPTION OF THE DRAWINGS

To explain the technical proposals of the examples of the present disclosure more clearly, the appended drawings used in the examples are briefly described hereunder. Apparently, the following described drawings are some examples of the present disclosure, but for persons skilled in the art, other drawings may be obtained without creative works according to these drawings.

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 6 shows examples of data to be loaded for providing heavy load/overload pre-warnings for distribution transformers.

FIG. 7 shows an example of transformer load data checking.

FIG. 8 shows an example of matching load data and customer data.

DETAILED DESCRIPTION OF ILLUSTRATED EXAMPLES

Figure 1:
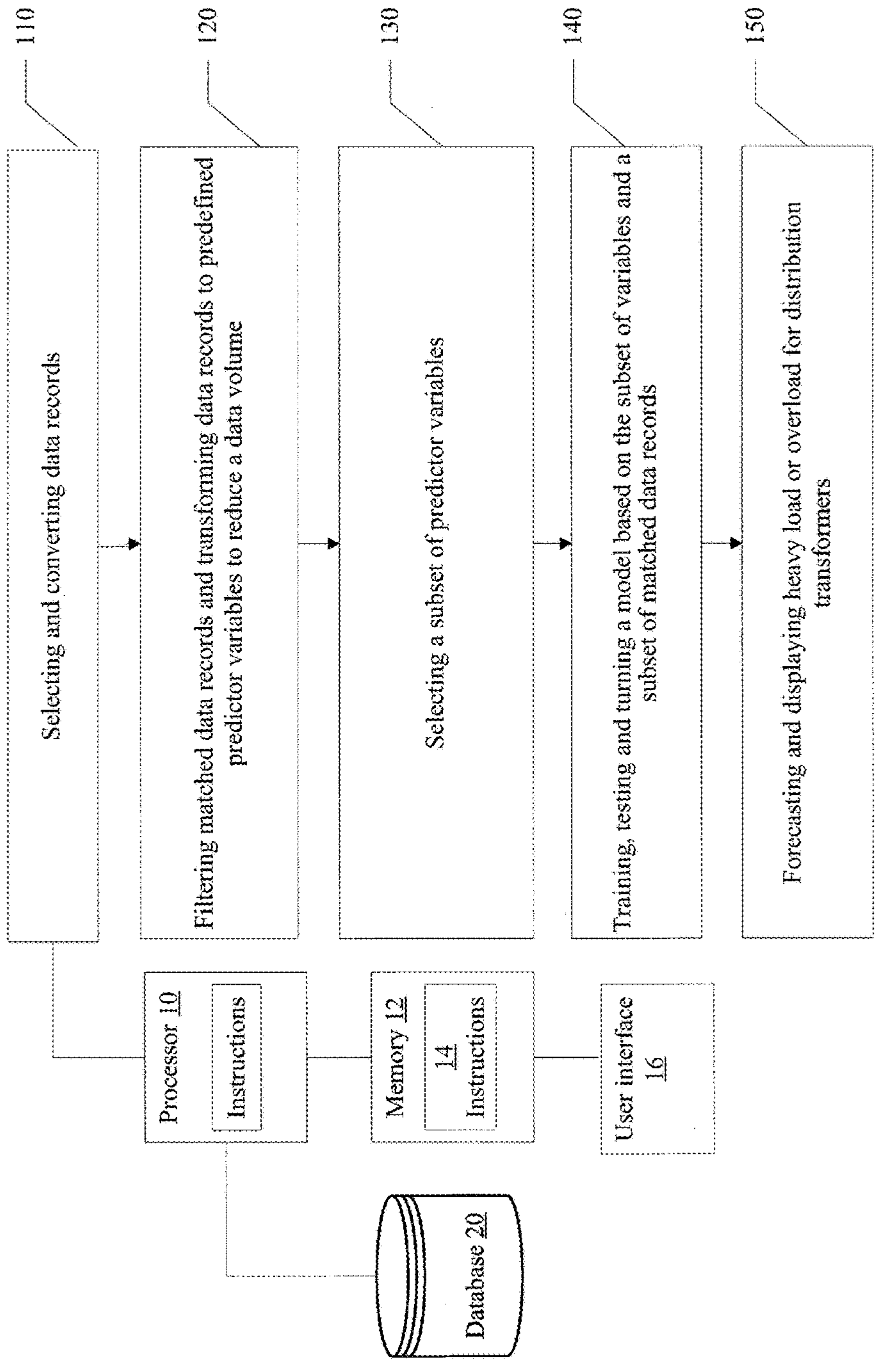
FIG. 1 is a flowchart of an example of a method for providing heavy load/overload pre-warnings for distribution transformers.

The principles described herein may be embodied in many different forms. Not all of the depicted components may be required, however, and some implementations may include additional components. Variations in the arrangement and type of the components may be made without departing from the spirit or scope of the claims as set forth herein. Additional, different or fewer components may be provided.

Reference throughout this specification to "one example," "an example," "examples," "one embodiment," "an embodiment," "example embodiment," or the like in the singular or plural means that one or more particular features, structures, or characteristics described in connection with an embodiment or an example is included in at least one embodiment or one example of the present disclosure. Thus, the appearances of the phrases "in one embodiment," "in an embodiment," "in an example embodiment," "in one example," "in an example," or the like in the singular or plural in various places throughout this specification are not necessarily all referring to the same embodiment or a single embodiment. Furthermore, the particular features, structures, or characteristics may be combined in any suitable manner in one or more embodiments or examples.

The terminology used in the description herein is for the purpose of describing particular examples only and is not intended to be limiting. As used herein, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

As used herein, the terms "module," or "unit" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term "module" or "unit" may include memory (shared, dedicated, or group) that stores code executed by the processor.

The exemplary environment may include a server, a client, and a communication network. The server and the client may be coupled through the communication network for information exchange, such as sending/receiving identification information, sending/receiving data files such as splash screen images, etc. Although only one client and one server are shown in the environment, any number of terminals or servers may be included, and other devices may also be included.

The described communication between devices may include any appropriate type of communication network for providing network connections to the server and client or among multiple servers or clients. For example, communication network may include the Internet or other types of computer networks or telecommunication networks, either wired or wireless. In embodiments, the disclosed methods and apparatus may be implemented, for example, in a wireless network that includes at least one client.

In some cases, the client may refer to any appropriate user terminal with certain computing capabilities, such as a personal computer (PC), a work station computer, a server computer, a hand-held computing device (tablet), a smart phone or mobile phone, or any other user-side computing device. In various embodiments, the client may include a network access device. The client may be stationary or mobile.

A server, as used herein, may refer to one or more server computers configured to provide certain server functionalities, such as database management and search engines. A server may also include one or more processors to execute computer programs in parallel.

The embodiments/examples and the features in the embodiments/examples may be combined with each other in a non-conflicting condition. The inventive aspects will become apparent from the following detailed description when taken in conjunction with the accompanying drawings.

The steps illustrated in the flowchart of the drawings may be performed at least partially in a set of computer devices using executable program code. And the order of the steps may be different from that in the drawings under some status, although an example logic order is shown in the flowchart.

The purpose, technical proposal and advantages in the examples of the present disclosure will be clear and complete from the following detailed description when taken in conjunction with the appended drawings. Apparently, the examples described thereinafter are merely a part of examples of the present disclosure, not all examples. Persons skilled in the art can obtain all other examples without creative works, based on these examples.

In areas with rapid economic growth, heavy loading and overloading for distribution transformers may occur frequently. Such heavy loading and overloading may damage the equipment and may lead to power outages. Therefore, it is important for the utility companies to know which distribution transformers may be loaded heavily and/or overloaded in the next year and/or in the next week. Such knowledge of the future may facilitate the annual planning and the emergency preparation.

However, at least two flaws may be found in using traditional load forecasting methods for distribution transformers: (1) Current load forecasting methods may need much longer historical data for a mid-term (such as one year ahead) prediction; (2) Load forecasting methods may need model-tuning for different loading characteristics, which means current load forecasting methods can't handle large amounts of distribution transformers with a high variety of load patterns.

The current disclosure is to develop a mid-term (such as a one year ahead) pre-warning model and a short-term (such as one week ahead) pre-warning model for distribution transformers. Both models can provide heavy-loading and overloading probabilities during a predicted-period for each distribution transformer in an area of interest.

The current disclosure may provide reusable predictive analytic solutions for the utility company's asset management in the distribution network. For example, the mid-term model may provide reference for investment on distribution transformers to optimize the priority of transformer upgrading and routine maintenance; the short-term model may provide support for critical periods such as summer including decreasing the response time of repair, optimizing patrol route, and therefore reducing user complaints.

FIG. 1 is a flowchart of an example of a method for providing heavy load/overload pre-warnings for distribution transformers. All steps shown in FIG. 1 may be performed by one or more processors 10 and may include execution of instructions 14 stored in memory 12.

Step 110: selecting and converting data records. One example implementation of Step 110 may include: selecting, with a processor 10, data records received from a plurality of data sources, the data records comprising electric power usage related information, wherein at least some of the data records are in a plurality of different data formats; and converting the data records in the plurality of different data formats into a pre-defined data format and populating a database 20 with the converted data records using the processor 10.

One or more utility companies or other data collectors may store data in various data sources and in different data formats. Due to the development of smart grid, large volumes of data have been collected and stored in utility companies' information systems, such as Advanced Metering Infrastructure AMI data, customer data, equipment data and weather data, and other data related to power distribution. The data may be collected at different times and may be stored in different data systems. Each data system may have its own data format. For example, some data may be stored in an oracle database, and some other data may simply be stored in an Excel spreadsheet. Therefore, even for one utility company or one data collector, data may be stored in different formats.

The data for generating pre-warning for distribution transformers may be selected from various data sources. Data records may include electric power usage related information, weather information and customer information that may be used for generating pre-warnings. Some of the data may be stored in utility companies' databases and some of data sources may be stored outside utilities companies' data system. For example, the utility companies may store or process AMI data in their own systems, or alternatively, the utility companies may utilize third party systems or cloud computing/storage for storing and processing data. As shown in FIG. 1, the one or more processors 10 may execute instructions 14 stored in memory 12 to read and select data from various data sources. The data to be selected may be evaluated by reviewing the project objective, checking the data availability and confirming the data for the pre-warning generation. As the data is read and selected for generating pre-warnings for distribution transformers, the data records selected and read may include electric power usage related data, weather data, customer data and other data related to power distribution.

The selected data records may be converted and stored in database 20. One example implementation may be to use an Oracle database to store the selected data records and utilize executable instructions such as R scripts to conduct the data processing. In order to utilize data retrieved to generate pre-warnings in a single system, the data can be placed in the uniform data format, for example a single Oracle database format. As such, data records selected and read from various sources having different data formats may be converted into a single data format. The data conversion may be performed before or after the data records are retrieved and stored in the database 20.

Even though the source data may be in the same type of data format such as Oracle database format, the data conversion may still be performed. The data definitions for the same data fields in different databases may be different. For example, the data definition for distribution transformer identification (ID) in two source Oracle database systems may be different. One system may define the distribution transformer ID as a ten character field, and another system may define as a fifteen character field. Therefore, the data conversion may be performed when different transformer IDs are loaded into the database 20.

Step 120: Filtering matched data records and transforming data records to predefined predictor variables to reduce a data volume.

One example implementation of Step 120 may include: filtering, with the processor 10, the data records in the database 20 by using a predetermined criterion and matching each of the filtered data records with one of a plurality of distribution transformers; and transforming the matched data records to a plurality of predictor variables with the processor by calculating values of the predictor variables from the matched data records according to a set of pre-designed methods, wherein the plurality of predefined predictor variables are designed to reduce a data record volume.

Another example for Step 120 may include: filtering, with the processor 10, the data records in the database 20 by using a predetermined criterion (sometimes may be referred as a threshold) and matching each of the filtered data records with one of a plurality of distribution transformers; and calculating predictor variables from the matched data records by a set of pre-designed methods with the processor 10, wherein the plurality of predefined predictor variables are designed to reduce a data record volume and capture the features that are related to the future heavy load and overload.

Data records may be loaded into the database 20 after filtering out the undesired data records by data checking. Data records may be checked or validated before loading. For example the data quality may be checked before loading. The data quality criteria for transformers may include, for example: whether the data records selected have value key values, and whether different data are matched correctly. In addition, the data quality check may include the percentage of valid daily load data. For example, a period having more than 85% of valid daily load data may be considered as a valid load data period, otherwise, the period may not be valid. The daily load may also contain a validity point check. For example, where there are 96 preset valid points identified for the daily load, the daily load may be considered valid data by the validity point check if less than 6 out of 96 valid points are missing, no continuous valid points are missing, and load values are not all 0.

Data records in the database 20 are matched according to their relationship. Because data records may be read and selected from various sources, the relationship between data records may be established before data records may be used for pre-warning generation. For example, data records from different data sources may be matched based on the transformer identification number (ID). Data records for the same transformer ID but for different dates may be matched to multiple data records for different users but with the same transformer ID. The data records matching may be conducted after the data records are loaded in the database 20 and the undesired records are filtered out.

Predictor variables may be defined for pre-warning for model training and prediction. An approach/methodology may be developed to define and identify the key predictor variables for predicting the future heavy loading and overloading conditions. By a set of methods, predictor variables describing the features of distribution transformers may be calculated from the pre-processed data records for modeling. Using predictor variables may dramatically reduce the data volume, while highlighting the features that are related to the future heavy load/overload. The methods in both power system and statistics domain may be used in designing predictor variables. Moreover, if a pattern that has relationship with future heavy load and/or overload is observed in the data exploration or model tuning process, a predictor variable may be designed to represent this pattern.

Predictor variables may be selected and tested before and during model fitting and testing process. Predictor variables may be reusable for different application areas. For example, a variable of weighted average load is defined as the weighted yearly average load during summer peak time. The variable may be for mid-term pre-warning and reflect the overall loading level, which may have a strong correlation with future heavy load/overload. An example formula to calculate weighted average load is:

$$\text{Yearly\_}Avg\text{\_Load}(a)=a\times AVG_{Y1}+(1-a)\times AVG_{Y2} \qquad \text{Equation 1}$$

Where, $AVG_{Y1}$, $AVG_{Y2}$: Average load of Year 1 and Year 2.

The range of a is [0, 0.5], the default value is 0.4

As another example for mid-term pre-warning, the variable of valley to peak ratio may describe the mean value of a valley to peak ratio of daily load curves. The loadings with lower valley to peak ratios may be more volatile, and therefore may be more likely to overload even with the same average load level.

$$\text{Daily\_VP\_Ratio}[i]=\frac{\min(\text{Daily\_Load}[i])}{\max(\text{Daily\_Load}[i])} \qquad \text{Equation 2}$$

$$\text{VP\_Ratio}=\text{mean}(\text{Daily\_VP\_Ratio}) \qquad \text{Equation 3}$$

Where,

Daily_Load[i]: can be, for example, a 96-point load curve of $i^{th}$ day.

A predetermined time period of data, such as three years of data may be used for mid-term modeling. Data of year one & two, for example, may be used for calculating the predictor variables for model fitting, and the data of year two & three, for example, may be used for updating the predictor variables for the predicting the heavy load/overload of the $4^{th}$ year.

The predictor variables may also be defined particularly for short-term pre-warning. For example, in short-term pre-warning, the data freshness and completeness may be both considered in selecting data. As the trend in recent load may have more correlation to the future load than earlier load variations, a recent period (such as four weeks before the predicted week) may be selected as a data section.

Furthermore, the predictor variables may be defined both for short-term and mid-term pre-warnings. For example, the overall peak period of last year that may be defined for mid-term pre-warning may also be used for short-term warning as the overall peak period of last year may also cover the complete short-term prediction period.

The predictor variables may be defined according to pre-defined categories. For example, thirteen predictor variables defined for mid-term pre-warnings may be categorized into three categories as shown in Table 1. In another example, thirty-five predictor variables defined for short-term pre-warnings may be categorized into five categories as shown in Table 2.

TABLE 1 predictor variables designed for the mid-term pre-warnings.

| Category | Number of predictor variables | Remark |
|---|---|---|
| Load | 8 | Descriptive statistics on load data |
| User | 3 | Description of user composition |
| Temperature sensitivity variables | 2 | Correlation between temperature and load |

TABLE 2 predictor variables designed for the short-term pre-warnings.

| Category | Number of predictor variables | Remark |
|---|---|---|
| Load of last year | 10 | Descriptive statistics on load data |
| Load of the recent weeks | 10 | Descriptive statistics on load data |
| Temperature sensitivity | 4 | Correlation between temperature and load |
| Weather forecast related | 8 | a correlation between the temperature and the load of each distribution transformer |
| User related | 3 | Description of user composition |

Predictor variables may also be defined dynamically. For example, if a pattern that has relationship with future heavy load and/or overload and is observed during the data processing such as data exploration or data model tuning process, a predictor variable may be designed to represent this pattern.

Data records may be fitted and transformed into predictor variables. For example, data records selected and loaded may be used to calculate predictor variables describing features of distribution transformers.

A transforming process may be to develop values of one or more predictor variables and store those values in the database 20 for the use in the later process. The transforming process may be a value development process for a predictor variable. The value development process may be a process to calculate values for one or more predictor variables by using selected and loaded data records. For example, in order to develop values for the predictor variable valley to peak ratio as shown in equation 2 above, the daily load values are read from data records, and the maximum and minimum load are determined from the daily load.

The value development process may also be a process to map values of one or more predictor variables by using the data record. For example, if a predictor variable may be defined as daily high temperature, the high temperature for each day may be retrieved from the data records selected and load and mapped to the predictor variable daily high temperature. After the fitting and transforming process, values of one or more predictor variables may be stored in the database 20 and may be ready for the later process. Because the values for the predictor variables may be only data values needed for the later process, the data records loaded and selected may not be used after the predictor variables are fitted with values. As such, the storage space in the database 20 for storing data records may be released after the fitting process is performed. Furthermore, because of the introduction of the predictor variables in the modeling process, values of predictor variables may only be used for the modeling process, only values of predictor variables may be loaded and processed in the memory 12 and by the processor 10 during the modeling process, there may not be any need to read and load data records originally selected and loaded. As such, the data volume for the whole process may be dramatically reduced.

Step 130: selecting a subset of predictor variables.

One example implementation of Step 130 may include: selecting, with the processor 10, a subset of the plurality of predefined predictor variables, wherein the predictor variables are selected according to a correlation test result.

Another implementation of Step 130 may include: selecting, with the processor 10, a subset of fitted data records from the database 20 for a selected subset of the plurality of predefined predictor variables, wherein the predictor variables in the selected subset are selected according to a correlation test result and a model tuning process for the predictor variables.

Only a subset of data records may be used for generating pre-warnings. Data records selected and loaded may contain more data records than the generation of pre-warning may need. As provided in Step 120, by fitting and transforming data records into predictor variables, the data volume may be dramatically reduced because one predictor variable value may represent many data records. Furthermore, because only a subset of predictor variables may be used for generating pre-warnings, the quantity of data records used for pre-warning generation may be further reduced.

Data model fitting and turning procedure may be used to select the subset of the predictor variables that are used for generating pre-warnings. For example, in order to select the subset of predictor variables for pre-warning generation, correlation tests may be developed. One example of correlation test may be for the system to determine whether the value of a pre-defined predictor variable relates to the historical outcome of heavy load and/or overload. If the value change of the pre-defined predictor variable relates to the known history heavy load and/or overload outcome for distribution transformers, the predictor variable may be a correlated variable and may be selected by the system, otherwise, the predictor variable may be removed from the subset. Another example of correlation test may be to for the system to determine whether values of two or more predictor variables move substantially in unison, such as by changing by about the same percentage. If values for two or more predictor variables change substantially together, only one of them may be selected by the processor 10.

The selection of predictor variables may be conducted by the system multiple times. After the initial subset is determined, additional selections for the subset of predictor variables may be conducted. For example, a testing modeling run may be conducted by the system with the initial selected subset of predictor variables. If a testing result fails, the system may adjust the predictor variables. The adjustment may include the system replacing one or more predictor variables with predictor variables removed during the initial predictor variable selection process (see step 120). The additional testing modeling run may be conducted by the system after the adjustment to the predictor variables is made by the system. The above adjustment and testing run may be repeated multiple times.

Step 140: Training, testing and tuning a model based on the subset of variables and a subset of matched data records. This step may include: training, testing and tuning a model based on the selected subset of variables and a subset of matched data records.

Another example of Step 140 may include: generating, with the processor 10, a model test result for each of the plurality of distribution transformers based on the selected subset of fitted data records, the selected subset of predefined predictor variables and a historical heavy load and/or overload result.

The pre-warning models may be determined by the method by using a classification algorithm. For example, the mid-term and short-term pre-warning models may be derived based on a classification algorithm such as a logistic regression. The methodology of heavy load and/or overload pre-warning may be to apply a classification algorithm that is capable of distinguishing the distribution transformers which are likely to have heavy or overload in the pre-warning period. Several classification algorithms may be used for transformer heavy load and overload pre-warning. For example, logistic regression may be used as the classifier. The benefits of logistic regression may include the algorithm matureness, fast training speed and transparency for model interpretation.

In order to training, testing and tuning the model, date preparation may be required. First of all, the predictor variables that may be used in the model generation are selected. The predictor variables may be a subset of the defined predictor variables. The fitted data, including pre-processed and selected data, may be a subset of matched data records. The data from the related data sources may also be converted and transformed into a set of predictor variables to fit the model. In addition, the historical outcomes of heavy load and/or overload for distribution transformers may be used. The historical outcomes may be a subset of available outcomes of heavy load and/or overload for a selected group of distribution transformers.

Further, training, testing and tuning the model may require the adjustment of predictor variables. For example, if the predicted outcome predicted by the model does not match the historical outcome, the selected predictor variables may be adjusted. The adjustment process may include replacing the predictor variables with similar variables, replacing the predictor variables with different variables, or replacing the predictor variables by creating new variables. The adjustment process may be further illustrated in FIG. 16.

Step 150: forecasting and displaying heavy load or overload for distribution transformers.

One example implementation of Step 150 may include: forecasting at least one of heavy load or overload for each of the plurality of distribution transformers in a predetermined region based on the model to provide the heavy load pre-warning or the overload pre-warning for the distribution transformers in the predetermined region; and displaying the forecasted heavy load or overload for the plurality of distribution transformers in a user interface 16 for upgrading the distribution transformers or generating a system alert for the distribution transformers.

The probabilities of heavy load and/or overload for distribution transformers in a predefined region may be generated by combining the results of pre-warning models and updated predictor variables with historical values. The results of pre-warning models may provide a benchmark of the heavy load and/or overload for distribution transformers. However, the model may have bias. For example, during a short-term pre-warning period, a hurricane coming and leaving the predicted area may cause rapid temperature changes, which affects the accuracy of the model result. As such, the updated predictor variables form historical data with weather similar to the predicted period may be used to better forecast the probabilities of heavy load and/or overload for distribution transformers.

The distribution transformers that are evaluated may be in a predefined geographic region. For example, the geographic region may define an economic zone with growing needs for electricity. While the utility company may consider upgrading distribution transformers in the economic zone, the probabilities of heavy load and/or overload for distribution transformers in the region may assist the utility company to identify distribution transformers to be replaced. The predefined region may also be defined in other alternative ways, such as school district, residential areas and/or industrial areas, etc.

The distribution transformers upgrade and the system alert may be generated using the forecasted result including probabilities of heavy load and/or overload for distribution transformers and provided pre-warnings. For example, the user, such as a utility company, may plan and conduct an upgrade for distribution transformers according to probabilities of heavy load and/or overload for distribution transformers. The probabilities of heavy load and/or overload for distribution transformers may be displayed in a user interface 16 for the user to view and use. The user interface 16 may be a special designed user interface for a user to view the forecast result. For example, a special designed graphic user interface (GUI) for a utility company. Different sets of result may be displayed differently in the GUI. For example, a graphical zone one and a graphical zone two having different colors may be displayed in the GUI. Because the overload and/or heavy load may damage the distribution transformers, in order to mitigate the damage to the distribution transformers, the utility company has the incentive to lower the occurrence of overload and/or heavy load. As such, the utility company may utilize the displayed forecasted result to conduct timely upgrades to the distribution transformers and protect its network assets.

A system alert may be generated. With regard to the short-term warnings, the utility company may receive a system alert that certain distribution transformers are likely to be overloaded or heavily loaded. The short-term heavy load and/or overload information can include probabilities and/or provided pre-warnings, which may be displayed in the user interface 16. The utility company may take actions, such as relocating the resources, to mitigate the possible heavy load and/or overload according to the displayed forecasted result. The user interface 16 may also contain a link to direct a user to another system, such as a maintenance system that may be used to reallocate the resources to mitigate the possible heavy load and/or overload. Because the heavy load or overload may cause an electrical outage, the mitigation procedures according to the displayed forecasted result may help the utility company to limit the number of electricity outages and reduce customer complaints.

The method shown in FIG. 1 may include a sub-step of the system retrieving historical predictor variable values from the database 20 for the selected subset of predefined predictor variables, wherein the retrieved historical predictor variable values are used for forecasting the at least one of heavy load or overload for each of the plurality of distribution transformers.

In order to accurately generate probabilities of heavy load and/or overload for distribution transformers, the historical values for predictor variables may be required. The data records selected and loaded in the database 20 may include historical values for the subset of predefined predictor variables. Therefore, historical predictor variable values may be retrieved from the database 20 for the selected subset of predefined predictor variables, where the retrieved historical predictor variable values may be used for forecasting the at least one of heavy load or overload for each of the plurality of distribution transformers.

The data records selected and loaded in Step 110 shown in FIG. 1 may include various data from various data sources. For example, data records may include transformer load data AMI data, weather data, user data and equipment data from data sources such as the utility company, or a third party vendor. Those data records may be stored in different data sources or formats.

The one or more criteria (and sometimes may be a threshold) used in filtering the data records as shown in Step 120 of FIG. 1 may include at least one of: a valid key value, a data matching verification, a percentage of valid daily load data, or a daily load validity.

The one or more criteria may be a key value. For example, the criterion (or a threshold) may be defined as the existence of a key value for a data record such as transformer ID, and data records may be filtered out if the transformer ID is missing.

The one or more criteria (or may be referred as a threshold) may also be conditions or predetermined numbers such as a data matching verification, a percentage of valid daily load data, and/or a daily load validity. For example, the criterion may be defined as a condition to indicate that the data records are matched correctly. Those data records that are not matched correctly (for example, the transformer load data with usage data for a transformer ID but missing the user data records for the same transformer ID) may be filter out while being loaded into the database 20.

The one or more criteria (or threshold) may be a predefined number. For example, the criterion may be defined as an 85% or greater valid daily load. A daily load having 85% or less valid data records may be filtered out. However, 85% is merely an example; other percentages may be selected dynamically by the system during the data load process or may be predetermined.

The one or more criteria may further be check points set with the system for the daily load. For example, ninety-six valid check points may be set for each daily load. The daily load may only be valid if certain criteria (thresholds) are met. For example, the invalid or not available check points are less than six, no continuous invalid checkpoints exist, and load values are not all zeros.

The criteria may be set dynamically by the system. The variations of criteria may be determined according to business rules or historical processing results. If 80% of valid daily load works the same as 85% of valid daily load for generating pre-warning analysis, the criterion (threshold) may be set to be 80% instead of 85%. The criteria (thresholds) may also be predetermined.

The predictor variables may also be designed to represent a pattern for the heavy load and/or overload for the distribution transformers. If a pattern that has a relationship with future heavy load and/or overload is observed in the data exploration or model tuning process, a predictor variable may be designed to represent this pattern.

The step of training, testing and tuning the model as shown in Step 140 of FIG. 1 may further includes: training the model by using a logistic regression, wherein the logistic regression comprises selecting a subset of predictor variables for a time window.

Only a subset of predictor variables for a particular time window may be used for running a logistic regression. For example, the prediction variables may be defined for many perspectives of the further forecast. As shown above, thirteen predictor variables may be defined for mid-term pre-warnings and thirty-five may be defined for short-term pre-warnings. However, the logistic regression may use less than thirteen variables for mid-term pre-warnings and thirty-five for short-term pre-warnings. In some examples, only two to six predictor variables may be used for the regression. As such only a subset of the predictor variables may be used.

Furthermore, multiple time windows may be defined for running the logistic regression. For example, the whole regression period may be for the whole summer, the summer may be divided into weeks, and the regression may be run for one week and another.

Some adjustments may be performed for the model during the training of the model. For example, replacing one or more predictor variables with other existing variables or by creating new variables. One or more suitable time windows may be tested and selected during the model training as well.

The logistic regression may be replaced by one of: random forest, support vector machine (SVM), decision tree and neural network. Many different methods/algorithms for statistical classification may be used to train and generate the model for pre-warnings. The logistic regression may be used due to, for example, algorithm matureness, fast training speed, and transparency for model interpretation. However, other methods may be selected to replace the logistic regression. For example, random forest, support vector machine (SVM), decision tree, or neural network. While testing by using the same predictor variables, these methods may achieve similar results to logistic regression.

Furthermore, as the method shown in FIG. 1, the pre-warning may be generated for either short-term or mid-term, or both. When the pre-warning is generated for short-term, in response to, for example, a rapid weather change, the short-term pre-warning comprises at least one of the following sub-steps: selecting a similar past weather condition; and/or predicting a total number of heavy load/overload transformers in an area and determining a cut-off point for predicted probabilities.

In short-term pre-warning, a difference between the modeling and prediction conditions may lead to a "biased" model. For example, if the modeling data contains much higher heavy load/overload ratios than the predicted week, the overall probabilities may be higher, and vice versa. For example, during a short-term pre-warning period, this scenario may happen when a hurricane coming and leaving the predicted area, causes rapid temperature changes.

As such, at least two methods may be developed to cure the "biased" model. Firstly, the model selected for applying the model for prediction may be used to cure the "biased" model. The model with the highest weather similarity to the future week may be chosen by the system, in order to lessen the bias of the predicted probabilities. Also, similar data records from the past for predicted further weather condition may be selected by the system to fit the model. Thus, the generated result may be less biased. Secondly, a sub-model may be built with the system to predict the number of heavy load and/or overload transformers, because there may be a relative steady relationship between the numbers of heavy load or overload transformers in an area and the temperature statistics of the week. Therefore, a sub-model may be built to predict the number of heavy load and overload transformers. And then, a cut-off point of predicted probabilities may be determined by using the predicted number of heavy load and/or overload transformers.

The cut-off point may be used by the system in pre-warning models to transform probabilities. As shown in Table 3, to calculate the recall and precision ratio in a confusion matrix, a cut-off point may be used to transform the probabilities into positives and negatives.

TABLE 3 a confusion matrix for pre-warning model

| | Predicted N | Predicted Y | |
|---|---|---|---|
| Observed N | a | b (type I error) | a/(a + b) |
| Observed Y | c (type II error) | D | d/(d + c) (recall ratio) |
| | a/(a + c) | d/(b + d) (precision ratio) | (a + d)/(a + b + c + d) (accuracy) |

The cut-off point may be set by the system according to the number of heavy load and/or overload transformers. When calculating the recall ratio and precision ratio, the value of cut-off point may be set to 50% by default. The cut-off point may be adjusted by the system according to the number of heavy load and overload transformers. For example, in mid-term pre-warning, if the predicted year has dramatic temperature decrease in summer, by which fewer transformers will have heavy load and overload, then the cut-off point may be set 10~20% higher. Similarly, in short-term pre-warning, if the predicted temperature of the coming week represents a dramatic temperature change, a local regression model may be used to predict the number of heavy loaded and overloaded transformers according to earlier observations, and such predicted number of transformers may also be used to adjust the cut-off point.

Figure 2:
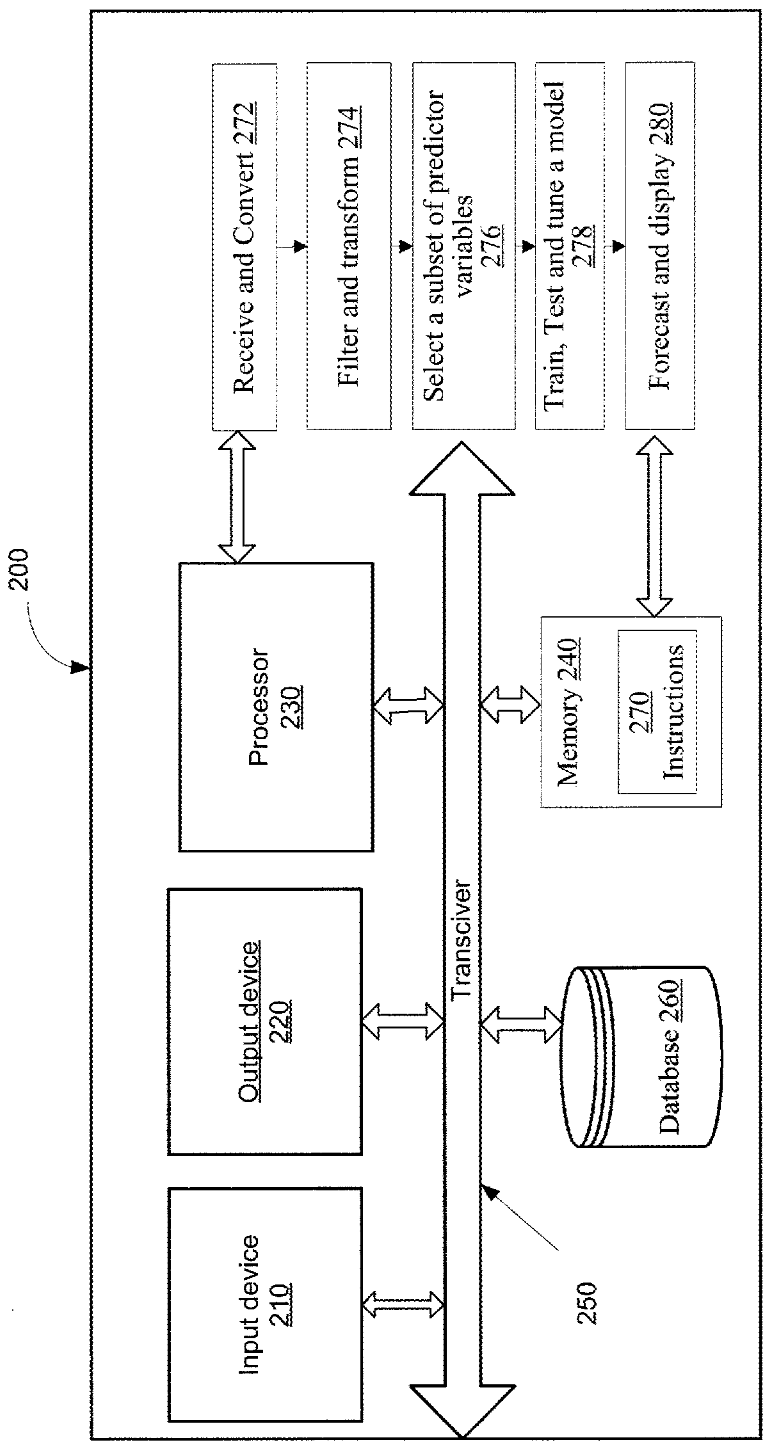
FIG. 2 illustrates a device for providing heavy load/overload pre-warnings for distribution transformers.

FIG. 2 illustrates a device for providing a heavy load pre-warning or an overload pre-warning for distribution transformers.

As shown in FIG. 2, the device 200 may include at least one processor 230, output device 220 (may be referred as a user interface), transceiver 250, memory 240, database 260, and instructions 270 stored in the memory. The transceiver 250 that may be in communication with the processor 230, and the transceiver 250 may be configured to receive data records from a plurality of data feeds by the input device 210, the data records comprising electric power usage related information, or weather information and/or customer information, where at least some of the data records are in a plurality of different data formats.

The database 260 stored in a non-transitory memory in communication with the processor 260, the processor 230 may be configured to convert the data records in the plurality of different data formats into a pre-defined data format and populate the database with the converted data records with the pre-defined data format.

The processor 260 may be further configured to transform the associated data records to a plurality of predefined predictor variables by calculating values of the predictor variables from the matched data records according to a set of pre-designed methods, where the plurality of predefined predictor variables are designed to reduce a data record volume; and select a subset of the plurality of predefined predictor variables, where the predictor variables in the selected subset are selected according to a correlation test result. The predictor variables may also be used to capture the features that are related to the future heavy load and overload.

The processor 260 may be further configured to train, test and tune a model based on the selected subset of variables and a subset of matched data records; and forecast at least one of heavy load or overload for each of the plurality of distribution transformers in a predetermined region based on the model for providing the heavy load pre-warning or the overload pre-warning for the distribution transformers in the predetermined region; and display the forecasted heavy load or overload for the plurality of distribution transformers in a user interface (output device 220) for upgrading the distribution transformers or generating a system alert for the distribution transformers.

Further, the process 230 of the device 200 may further be configured to: retrieve historical predictor variable values from the database for the selected subset of predefined predictor variables, where the retrieved historical predictor variable values are used for forecasting the at least one of heavy load or overload for each of the plurality of distribution transformers.

The predetermined condition that may be used in the device 200 may comprise at least one of: a valid key data value, a data matching determination, a percentage of valid daily load data, or a daily load validity. The processor 230 of device 200 may define predictor variables that may be designed and developed to represent a pattern for the heavy load or overload of the distribution transformers.

When the model is trained, tested and/or tuned by the processor 230 in device 200, the instructions 270 executable by the at least one processor 230 may further cause the device to: train the model by using a logistic regression, wherein the logistic regression can be replaced by one of: random forest, support vector machine (SVM), decision tree and neural network.

The pre-warning generated in the device 200 may include a short-term pre-warning and a mid-term pre-warning. The short-term pre-warning, in response to a dramatic weather change, may include at least one of following processes: (1) selecting a similar history weather condition; (2) determining a cut-off point for the dramatic weather change. The short-term warning may include predict the total number of heavy load/overload transformer in an area and determining a cut-off point for the predicted probabilities.

Figure 3:
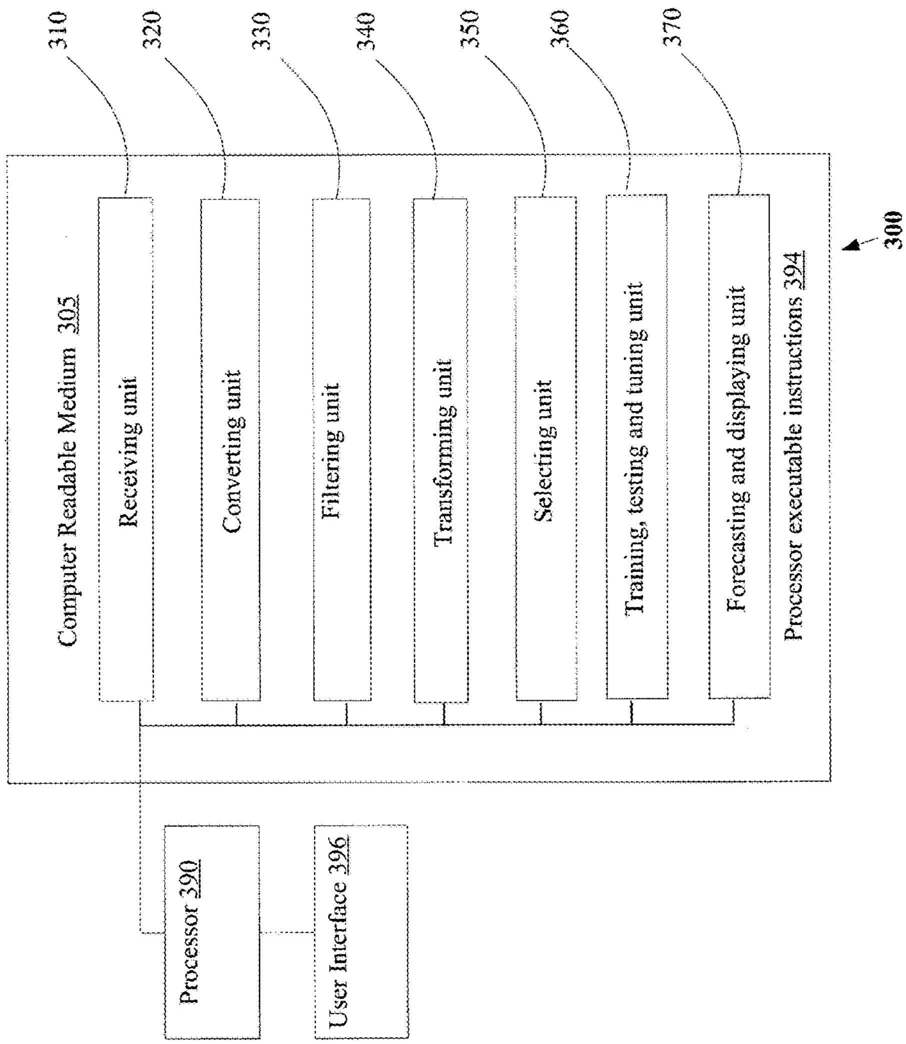
FIG. 3 illustrates a system having a computer readable medium for providing heavy load/overload pre-warnings for distribution transformers.

FIG. 3 illustrates a system 300 having a computer readable medium 305 for use in providing heavy load/overload pre-warnings for distribution transformers. The computable readable medium 305 may be other than a transitory medium. The units shown in FIG. 3 include hardware and processor executable instructions 394 stored on the computer readable medium 305. The instructions 394 may be read and processed by processor 390, and may be executed during operation of the system to support at least some of the functions performed by the system as described elsewhere.

As shown in FIG. 3, the system 300 may include a computer readable medium 305 with processor executable instructions 394 stored thereon and a user interface 396, wherein the processor executable instructions 394 may be stored in computable readable medium 305. The system may use at least some of the instructions executed by the processor 390 to: receive data records from a plurality of data feeds (not shown) using a receiving unit 310, the data records comprising electric power usage related information, where at least some of the data records are in a plurality of different data layouts; and convert the data records in the plurality of different data layouts into a pre-defined data layout and populate a database (not shown) with the converted data records using a converting unit 320.

The system may further use at least some of the instructions executed by the processor 390 to filter by using a filtering unit 330, with the processor 390 the data records in the database (not shown) by using a predetermined condition and associate each of the converted data records with one of a plurality of distribution transformers; and transform, with the processor 390, the associated data records to a plurality of predefined predictor variables by using a transformer unit 340 by calculating values of the predictor variables from the matched data records according to a set of pre-designed methods, wherein the plurality of predefined predictor variables may be designed to reduce a data record volume and/or may be used to capture the features that are related to the future heavy load and overload.

The system may further use at least some of the instructions executed by the processor 390 to select using a selecting unit 350, with the processor 390, select a subset of the plurality of predefined predictor variables, wherein the predictor variables in the selected subset are selected according to a correlation test result; to train, test and tune a model using a training, testing and tuning unit 360, with the processor 390, a model based on the selected subset of variables and a subset of matched data records; and by using a forecasting and displaying unit 370 to forecast at least one of heavy load or overload for each of the plurality of distribution transformers in a predetermined region based on the model for providing the heavy load pre-warning or the overload pre-warning for the distribution transformers in the predetermined region and display the forecasted heavy load or overload for the plurality of distribution transformers in a user interface 396 for upgrading the distribution transformers or generating a system alert for the distribution transformers.

The processor executable instructions 394 stored in the computer readable medium 305 when executed by the processor 390 may further cause the system to: retrieve historical predictor variable values from the database for the selected subset of predefined predictor variables, wherein the retrieved historical predictor variable values are used for forecasting the at least one of heavy load or overload for each of the plurality of distribution transformers.

The data records used in the system 300 may comprise: transformer load data (AMI data), weather data, user data and equipment data. The predetermined condition used in the filtering unit 330 may include at least one of: a valid key data value, a data matching verification, a percentage of valid daily load data, or a daily load validity.

The predictor variables used in the system 300 to generate pre-warnings may be designed and developed to represent a pattern for the heavy load or overload of the distribution transformers.

The training, testing and tuning unit 360 may utilize a logistic regression method to generate the pre-warning models. In addition, the logistic regression method may be replaced by anyone of following methods: random forest, support vector machine (SVM), decision tree and neural network. Different methods may be used to achieve the similar result. Those methods may be used individually. Or alternatively, one or more of those methods may be used together. In addition, other methods may be utilized when necessary.

The pre-warnings provided by the system 300 may include a short-term pre-warning and/or a mid-term pre-warning. When the short-term pre-warning is generated, in response to a dramatic weather change, the short-term pre-warning may include at least one of following processes: (1) selecting a similar history weather condition; (2) predicting a total number of heavy load/overload transformers in an area and determining a cut-off point for predicted probabilities.

Figure 4:
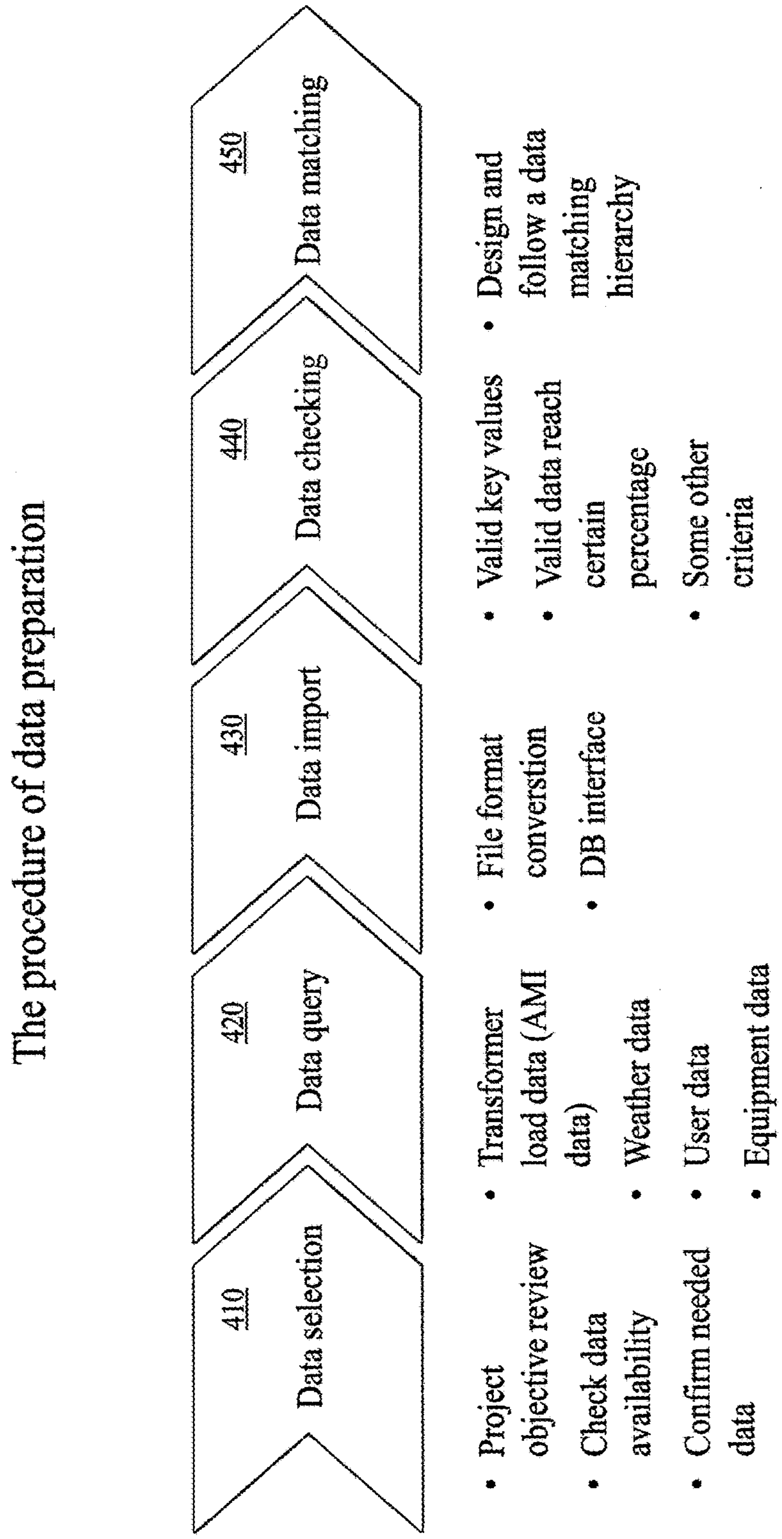
FIG. 4 illustrates procedures of data preparation.

FIG. 4 illustrates example procedures of data preparation. As shown in FIG. 4, the procedures of data preparation include data selection 410, data query 420, data import 430, data checking 440 and data matching 450.

In order to conduct the date selection 410, the time period for the data to be selected may be determined. For example, in an example implementation of the pre-warning generation in the predetermined region, the AMI data may show that most heavy load and overload occur during the summer time. Surveys in the utility company of that particular region may also show that "meeting the power supply in summer peak periods is one of their critical annual tasks". So the short-term pre-warning may be used to support this critical period.

Figure 5:
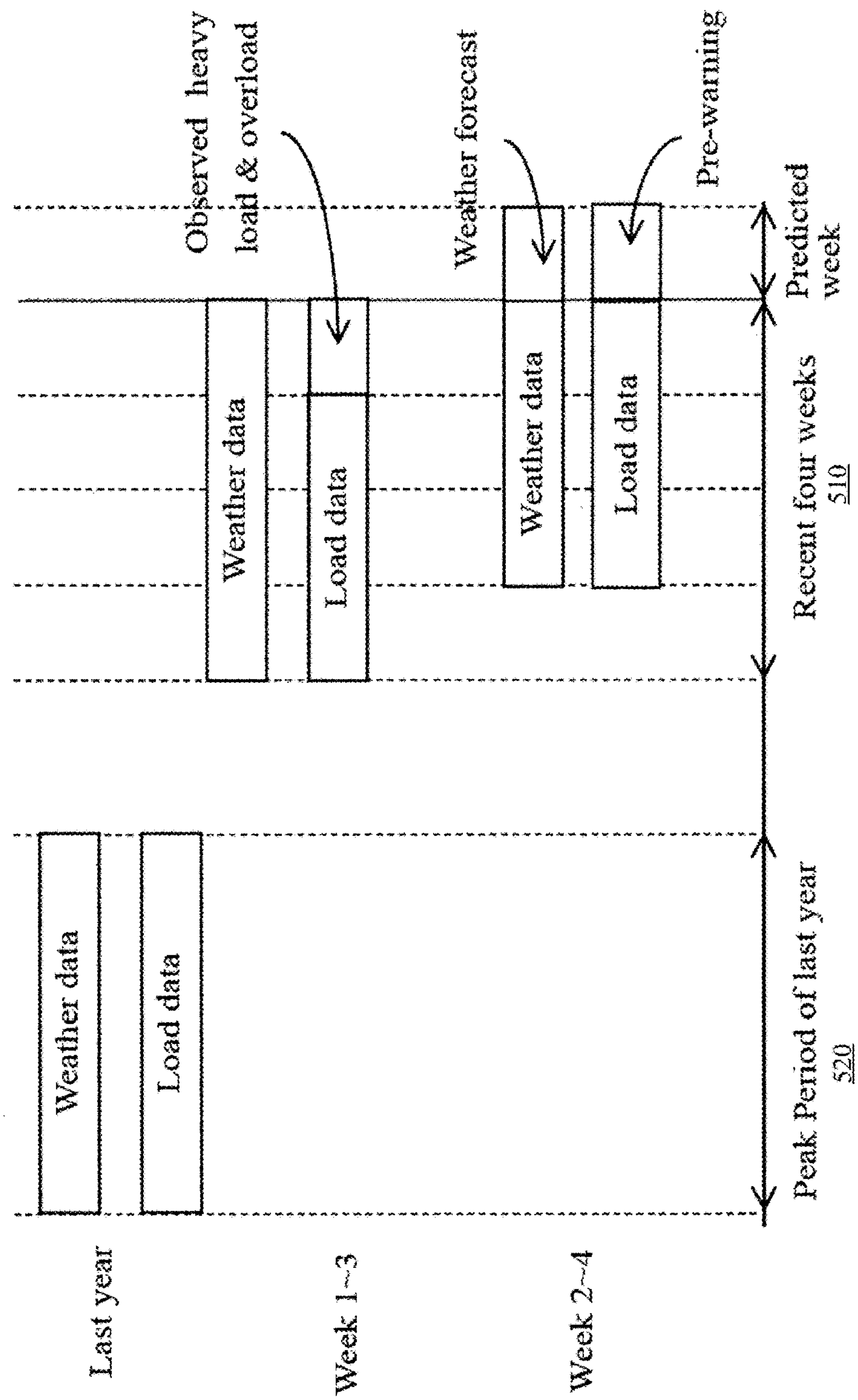
FIG. 5 shows an example of time period selection of the data for the short-term.

In selecting the time period of the data set for generating pre-warnings, both the freshness and the completeness should be considered. FIG. 5 shows an example of the time period selection of the data. As shown in FIG. 5, four weeks before the predicted week 510 is selected because the trend in recent load has more correlation to the future load than earlier load variations. The summer peak period of last year 520 may also be selected, because it may cover the whole period when the short-term pre-warning generation is performed.

As shown in the example of Table 4, besides the distribution transformer AMI data, the customer data, weather data and equipment data may also be selected for modeling.

TABLE 4

The Data Selected for the Short-term Pre-warning Model

| Data type | Description |
|---|---|
| Transformer load data | last year and recent 4 weeks |
| Weather data | last year and recent 4 weeks 7-day weather forecast |
| Equipment data | Transformer capacity, service years, etc. |
| Customer data | Customer type and applied capacity |

FIG. 6 shows examples of data to be loaded for providing heavy load/overload pre-warnings for distribution transformers. As shown in FIG. 5, transformer load data 610, weather data 620 and user data 630 may be selected and loaded for the data preparation for pre-warning generation.

FIG. 6 also shows an example of 96 points of valid daily load data per transformers as P1 to P96 640. In other examples, other quantities of data points may be used.

Table 5 illustrates an example of data that may be used for generating mid-term and short-term pre-warnings.

TABLE 5

| Data needed for modeling | | |
|---|---|---|
| | Mid-term Pre-warning | Short-term Pre-warning |
| Transformer load data | Past 3 years | Last year and recent month |
| Weather data | Past 3 years | Last year and recent month 7-day weather forecast |
| Equipment information | Transformer capacity, service years, etc. | |
| User information | Customer type, applied capacity and monthly usage | |

In general, the heavy load may refer to the loading continuously stays above a predetermined percentage of rated capacity, such as 70%, for more than a predetermined period of time, such as one hour, and overload may refer to loading above 100% of rated capacity for a predetermined period of time, such as one hour or more. However, actual situations may be complex when the actual loading rises and falls between the thresholds. Therefore, a set of rules may be designed for counting the heavy load and overload times occurring in a predetermined period in order for selecting and loading data precisely.

FIG. 7 shows an example of transformer load data checking. As shown in FIG. 7, certain data field may have value of 0. For example, capacity 710 has a value of 0 for transformer ID T00006689. FIG. 7 also shows examples of not available valid points in transformer load data. In FIG. 7, P2 values are not available (NA) for both transformer ID T00006688 and T00006689. According to FIG. 7, the data record for transformer ID T00006689 may be filtered out because the key value of capacity 710 is missing. However, the first data record for transformer ID T00006688 may not be filtered out if the value for P2 720 is the only daily valid point value that is not available (NA). The data record without the valid check point value may not be filtered out automatically. The data record may be filtered out only if the number of missed daily valid point values is greater than a predetermined number (6 for example).

FIG. 8 shows an example of the system matching load data and user data. As shown in FIG. 8, both the transfer load data 810 and the user data 820 can have three rows with the same transformer ID T00006688, as such, all three rows of transformer load data 810 and 3 rows of user data 820 may be matched together. As shown in FIG. 8, three rows of transformer load data 810 are load data for the same transformer on multiple dates and three rows of user data 820 are user data for multiple users for the same transformer. Because both transformer load data 810 and user data 820 may be needed in generating pre-warnings, if the data matching fails, for example, either part or all transformer load data for a user are missing or part or all user data for a transformer data are missing, the data may be consider having defects and may not be loaded for prediction generation.

Figure 9:
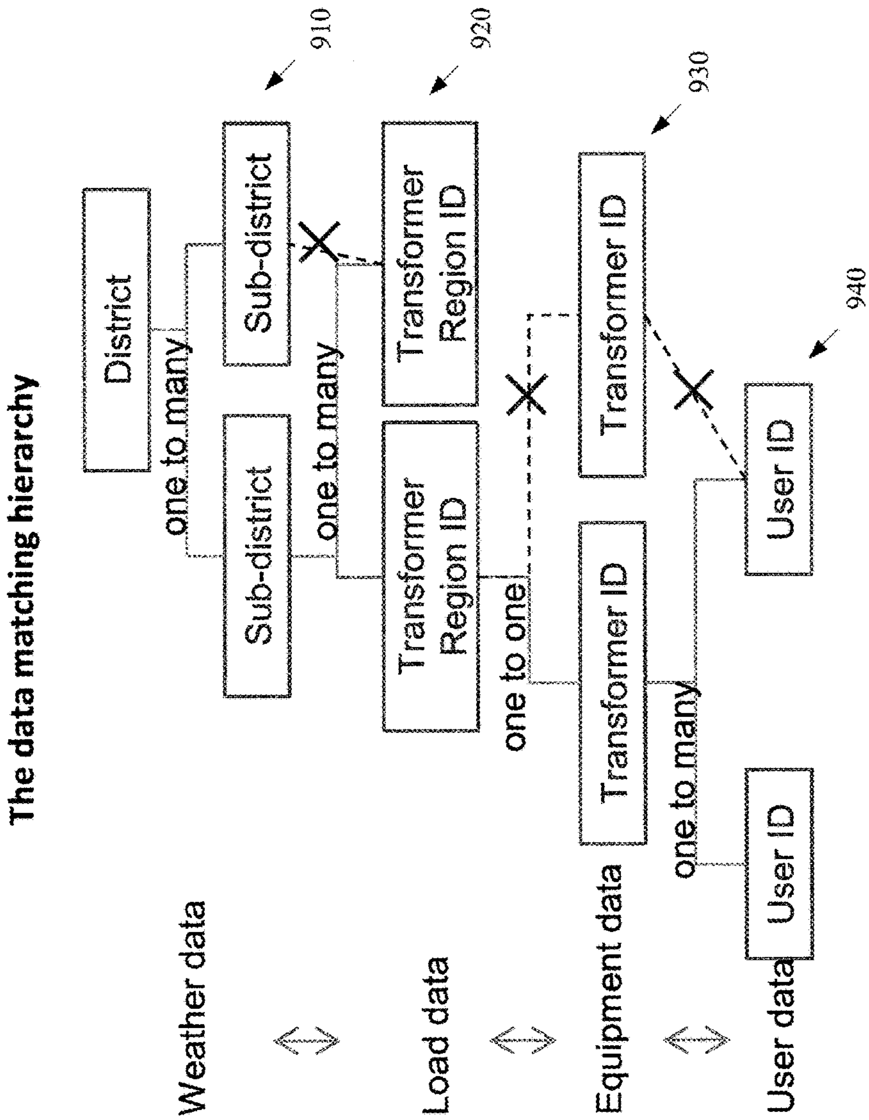
FIG. 9 illustrates an example of data matching hierarchy.

FIG. 9 illustrates an example of data matching hierarchy. As shown in FIG. 9, the data matching hierarchy may be constructed by the system after the data matching is conducted on selected and loaded data records. In order to generate the pre-warnings as accurate as possible, certain data may be required. For example, weather data, load data, equipment data and user data. If one or more of required data are missing, the unmatched data may be filtered out. According to the example of FIG. 9, data records for sub-district 910, transformer region ID 920, transformer ID 930 and user ID 940 are filtered out because they can't be matched with other data.

Figure 10:
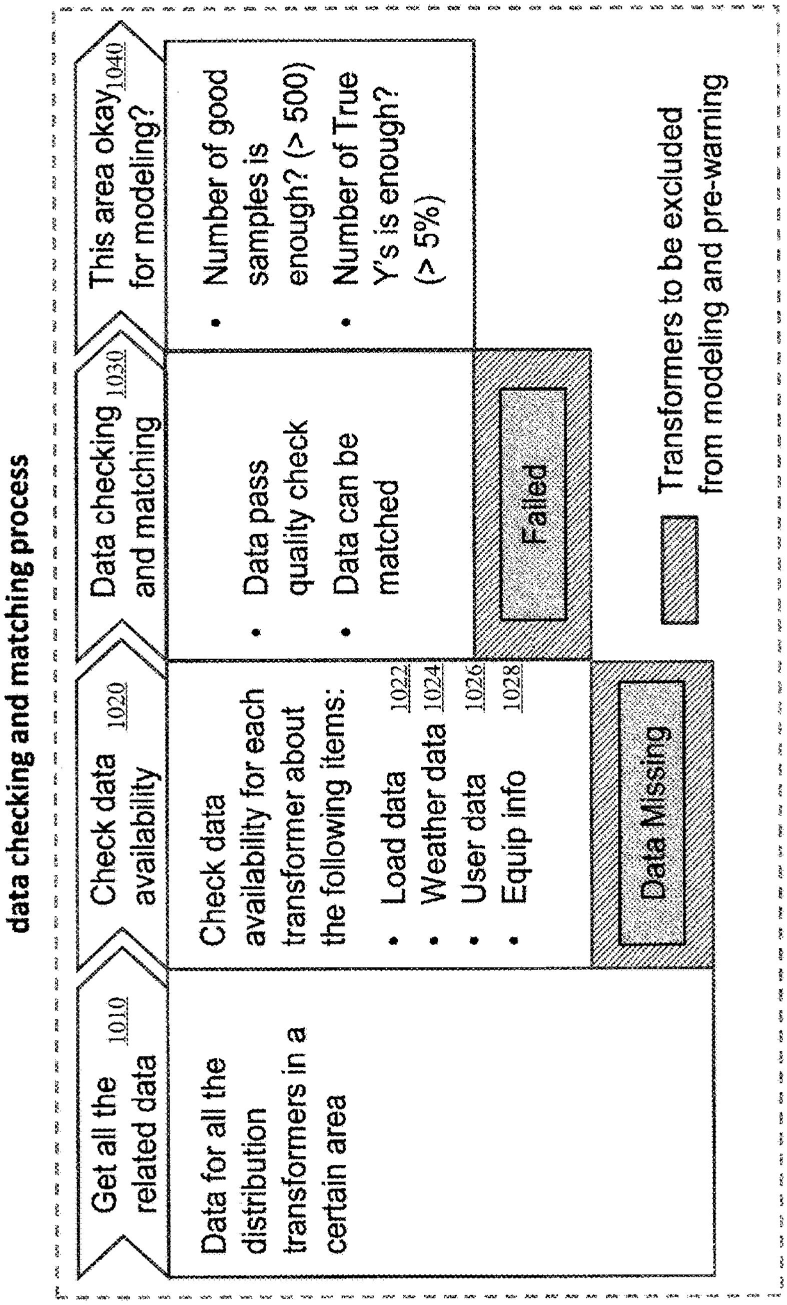
FIG. 10 illustrates an example of data checking and matching process.

FIG. 10 illustrates an example of the data checking and matching process performed by the system. According to the example shown in FIG. 10, and referring also to FIG. 1, the first step for the data checking and matching process is to get all the related data 1010 as discussed with reference to step 110 in FIG. 1. In this step, data for all distribution transformers in a certain geographic area are collected. Secondly, the system checks the data availability 1020. In this step, the data availability is checked for each transformer in four areas: load data 1022, weather data 1024, user data 1026 and equipment data 1028. If data is not available for one or more those areas, the data for the transformer are excluded from modeling and pre-warning generation. Thirdly, data checking and matching 1020 is performed for available transformer data as described with respect to step 120 in FIG. 1. A quality check can be conducted for available transformer data, and after that, available transformer data can be matched. Those available data records for transformers are excluded from modeling and pre-warning generation if the data fail the quality check and/or can't be matched with each other.

Finally, the system may determine whether the selected geographic area is okay for modeling 1040. As shown in FIG. 10, the area is okay for modeling when the number of good samples is above a threshold. For example, the number of good samples may be okay when the sample data for over a pre-set number, such as five-hundred distribution transformers are available and pass the data checking and data matching process, as previously discussed in step 120 in FIG. 1. On the other hand, the number of historical heavy load and/or overload may be checked against the threshold. For example, the percentage of available historical outcome heavy load and/or overload among those transformers with good sample data should be greater than a pre-set percentage, such as 5%.

Figure 11:
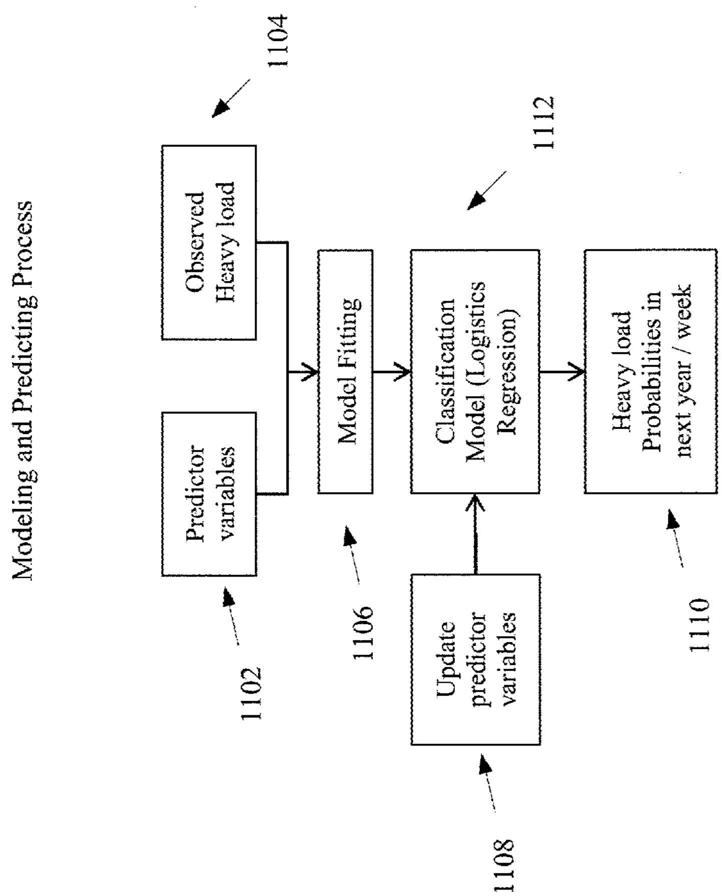
FIG. 11 illustrates an example of overall modeling and predicting process.

The mid-term and short-term pre-warning models may be derived based on a classification algorithm such as logistic regression, as previously discussed. The methodology of heavy load and overload pre-warning may be to apply a classification algorithm that is capable of distinguishing the distribution transformers which are likely to have heavy or overload in the pre-warning period. FIG. 11 illustrates an example of a modeling and predicting process performed by the system. As shown in FIG. 11, the data from the related data sources can be fitted into a set of predictor variables 1102. The predictor variables 1102 and observed heavy load 1104 may fit the model 1106. Then the variables may be updated 1108 and put in the model 1112 for prediction. Usually there may be 2~6 variables in the final logistic regression model.

Figure 12:
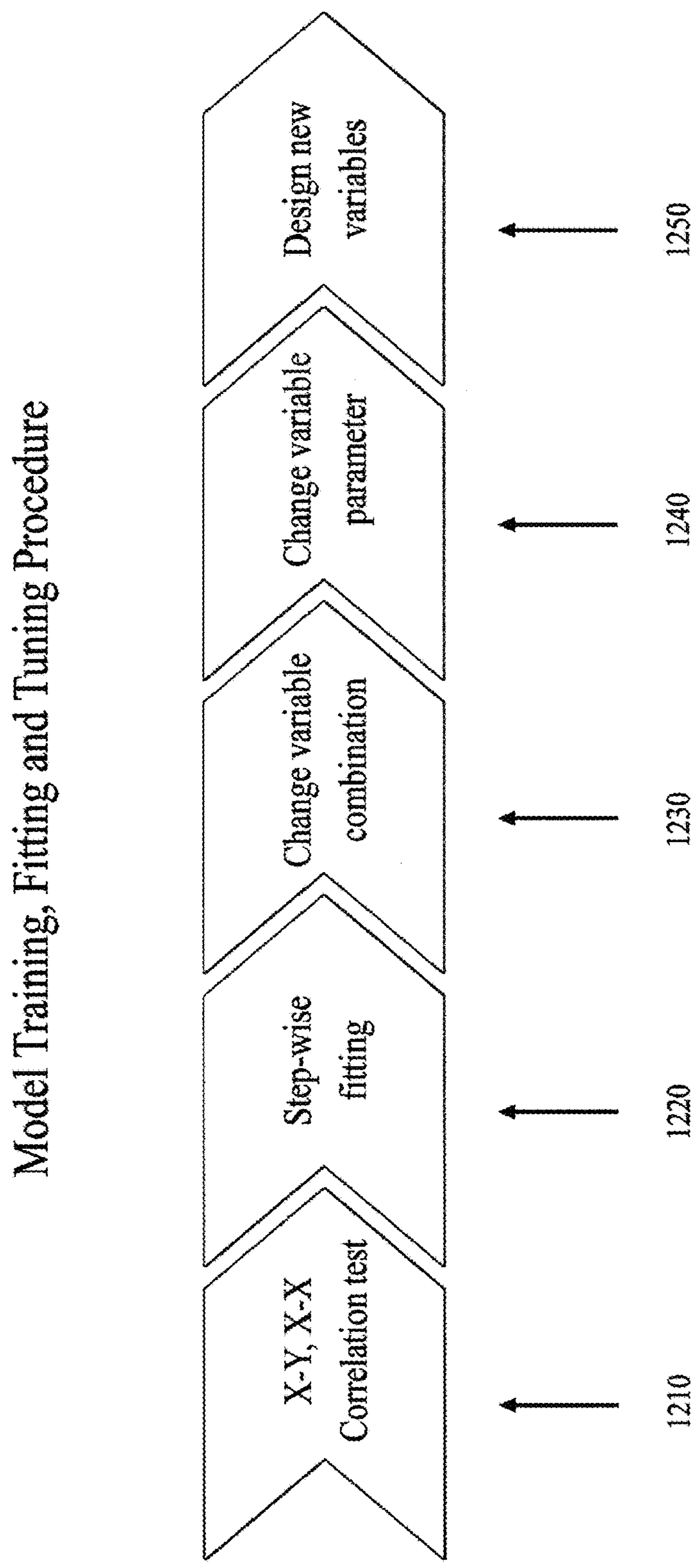
FIG. 12 illustrates an example of model training, testing and tuning process.

After preparing the data (including the predictor variables and outcome variable), model fitting and testing may be carried on, as previously discussed in step 140 in FIG. 1. FIG. 12 illustrates an example of model fitting and tuning process, which was also previously discussed with regard to step 140 of FIG. 1. As shown in FIG. 12, the model fitting and tuning procedure can include a X-Y, X-X correlation test, 1210, step-wise fitting 1220, change variable combination 1230, change variable parameter 1240 and design new variables 1250. If the model passes testing, the tuning procedure may stop. If the model doesn't pass testing, further tuning steps will be carried on. Each of these model fitting and tuning procedures are further describes elsewhere, including FIG. 16.

Sometimes, in the short term pre-warning model, a correlation sub-model between the temperature and the load of each distribution transformer may be built using local regression to generate the predictor variables with a weather forecast, such as a seven day weather forecast. In short-term pre-warning, the heavy load and overload in a predetermined period of time, such as in the next week may usually be affected by the temperature change, so predictor variables incorporating the weather forecast may be used to improve the model.

Figure 13:
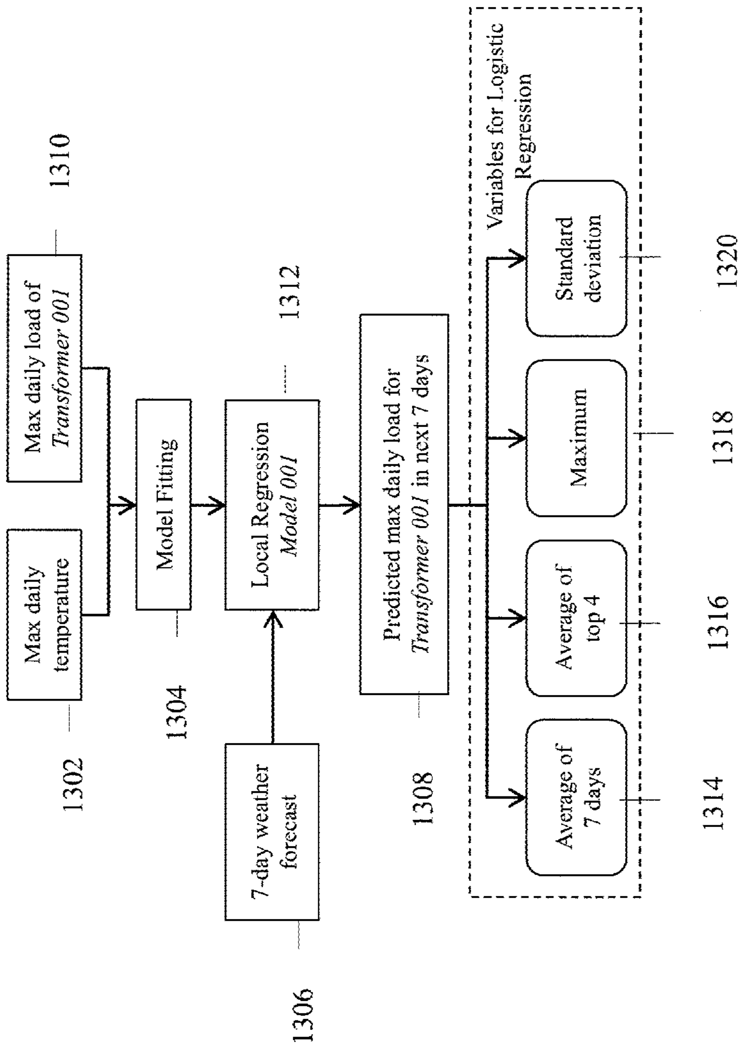
FIG. 13 shows an example of a correlation sub-model to incorporate weather forecast for the short-term.

FIG. 13 shows an example of generating predictor variables by using a correlation sub-model. As shown in FIG. 13, local regression (loess) may be applied for building a model between maximum daily temperature and maximum daily load for each distribution transformer using historical data. After applying the temperature of a predetermined future period, such as for the next 7 days, the maximum daily load of the predetermined future period may be predicted to further formulate predictor variables for logistic regression.

According to the example of FIG. 13, historical maximum daily temperature data 1302 and maximum daily load of transformer 001 1310 may be gathered by the system and fed to local regression model 001 1312 after the model fitting 1304 is conducted. 7-day weather forecast 1306 may also be collected and may also be fed to local regression model 001 1312. The predicted maximum daily load for transformer 001 in the next 7 days 1308 may be derived as the result of local regression model 001 1312. The predicted maximum daily load for transformer 001 in the next 7 days 1308 may be used to derive predictor variables for logistic regression. The derived predictor variables may include, for example, an average of 7 days 1314, average of top 4 days 1316, Maximum load 1318 and standard derivation 1320.

Figure 14:
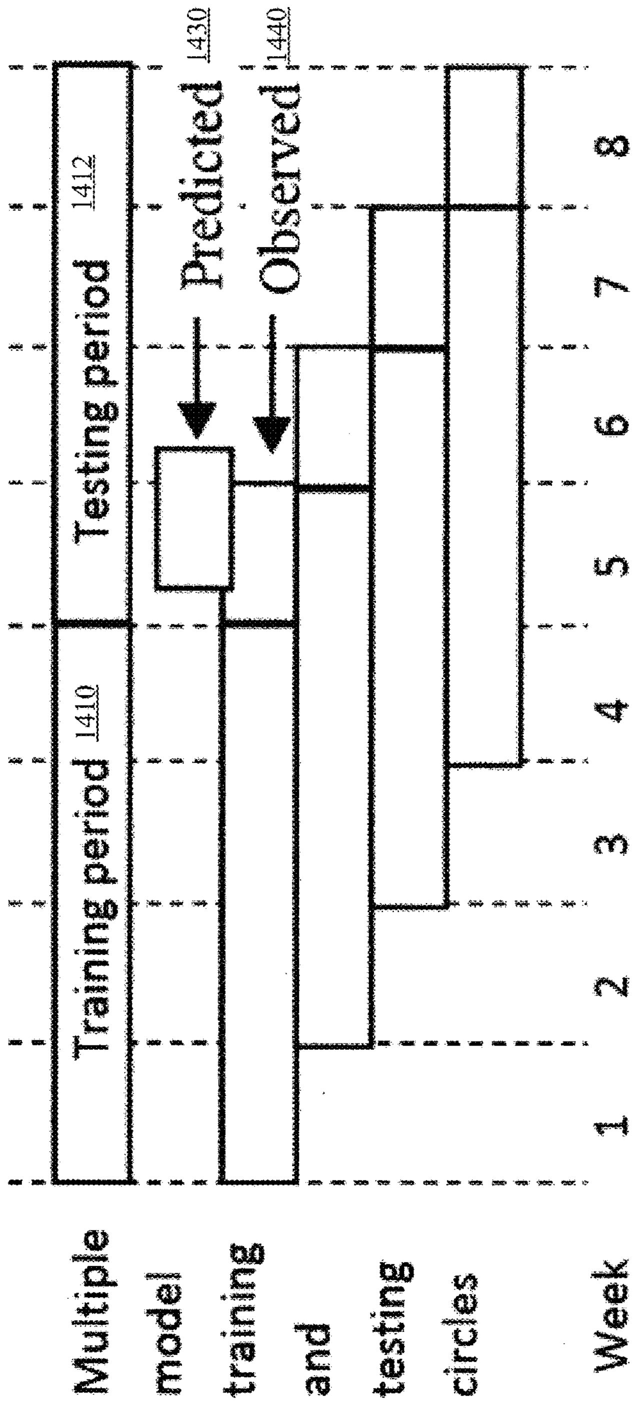
FIG. 14 illustrates the sliding window model testing approach for the short-term pre-warnings.
Figure 15:
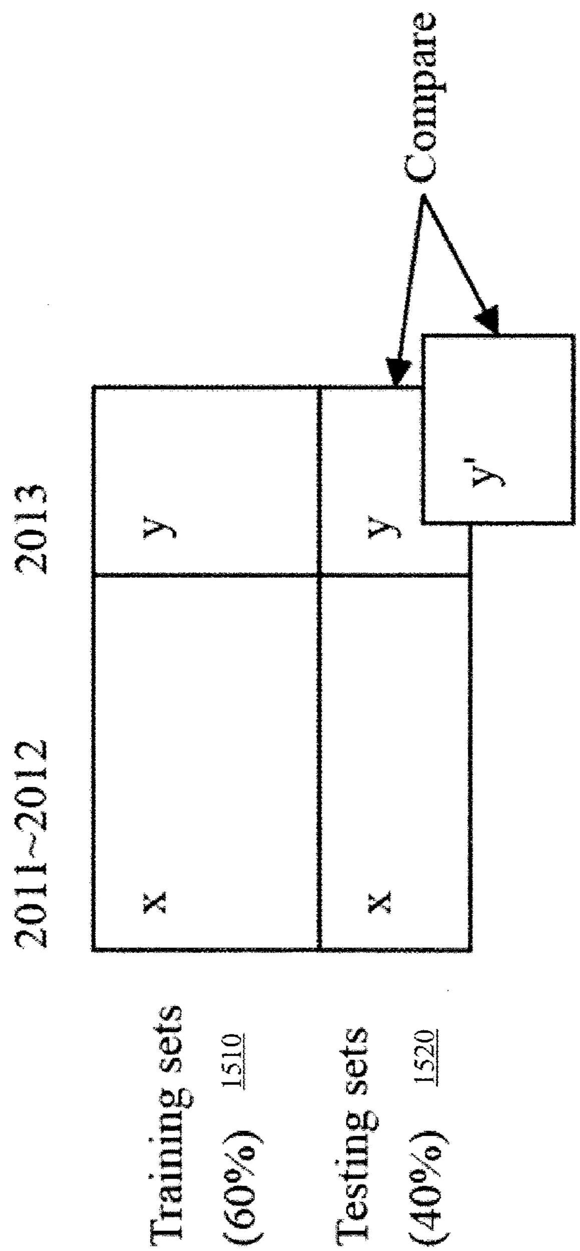
FIG. 15 illustrates the division of training and testing sets for the mid-term pre-warnings.

For the mid-term pre-warning model, the data may be randomly split by the system a predetermined number of times, such as 10 times, by a given percentage for a comprehensive evaluation. As short-term forecasting may be published one or multiple times a week, a sliding window approach may be used by the system to cover all the samples. FIG. 14 illustrates the sliding window approach for mid-term pre-warnings. In FIG. 14, the training period 1410 and the testing period 1420 are illustrated for the multiple model training and testing sessions. As shown in FIG. 14, the prediction 1430 from the model and the actual historical outcome (observed outcome 1440) of heavy load and/or overload are compared to determine how the model accurately predicts the heavy load and/or overload. FIG. 15 illustrates the division of predictor variables. FIG. 15 shows that predictor variables may be divided into training sets 1510 and testing sets 1520. As shown in FIG. 15. The predicted outcome (y') may be compared with observed outcome (y) to determine accuracy of the model.

Directly applying the model with all variables may not provide a completely accurate result, so a procedure of model tuning may be designed as follows. Firstly, the predictor variables which have little relevance with the historical outcome of heavy load and/or overload may be excluded, and the correlation between variables is calculated by the system. Discussions about the relevancy between variables are provided along with FIG. 16 below. The following steps include step-wise fitting, manually changing the variable combination and even designing new variables. Model fitting and testing may be carried out after each step. The tuning procedure may stop if the model passes the model testing (FIG. 14).

Figure 16:
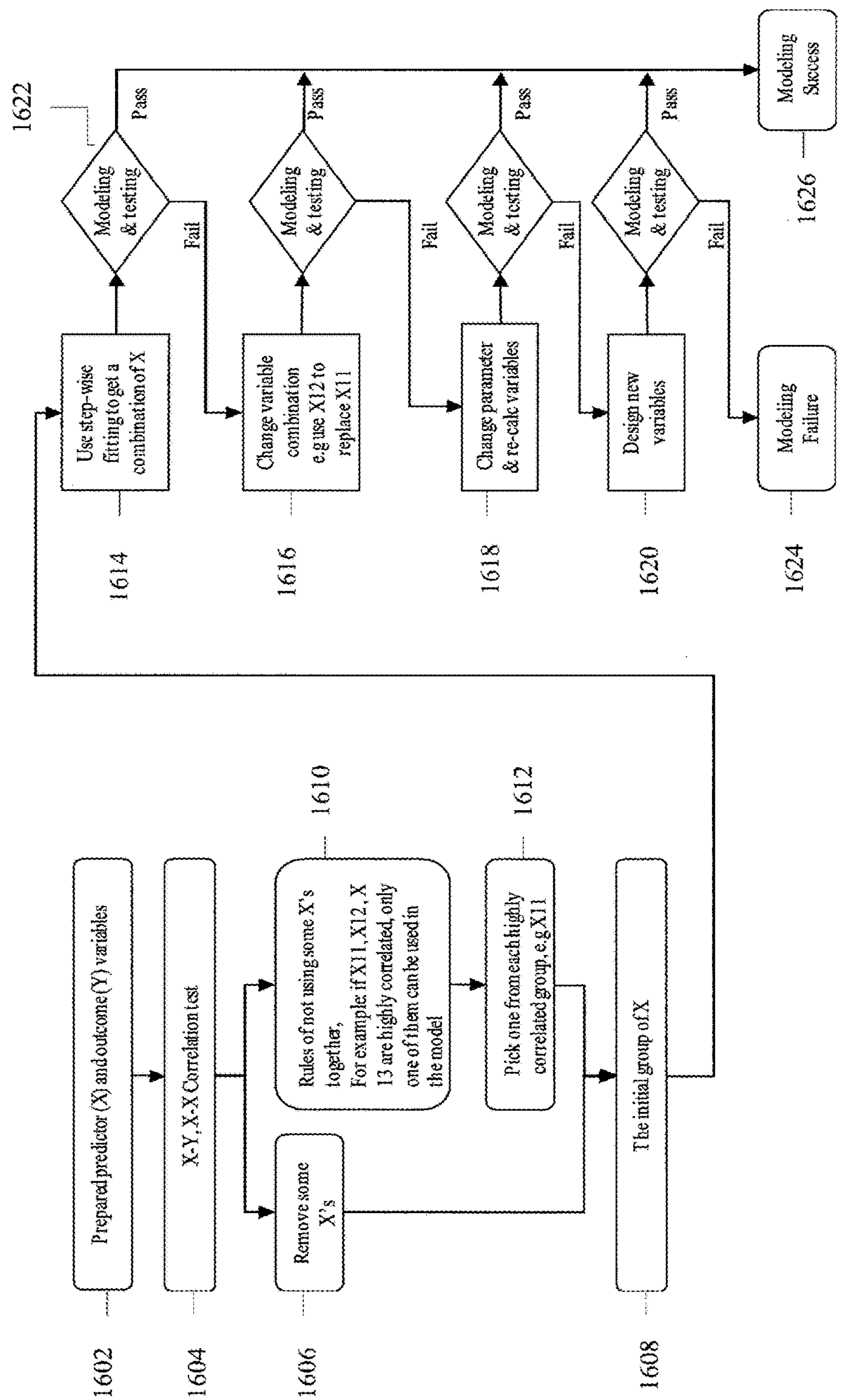
FIG. 16 shows an example of model fitting and tuning procedures in a block view.

FIG. 16 shows an example of model fitting and tuning procedures in a block view in the form of an example of the X-Y, X-X correlation test, 1210 of FIG. 12. As shown in FIG. 16, the predictor variables (X) and historical outcome variable (Y)1602 are identified by the system for the model fitting and tuning procedure. Then, the correlation test for X-X and X-Y 1604 may be performed to determine how much a predictor variable is related to another predictor variable (X-X) and how much a predictor variable is related to the historical outcome of heavy load and/or overload (X-Y).

A possible numerical value may be determined for the correlation test result. For example, the result is defined as a range of [−1, 1], in which −1 represents X-X or X-Y moves in opposite directions while 1 represents X-X or X-Y moves in the same direction. The middle value 0 represents that no relationship between X-X or X-Y.

The initial group of predictor variables X 1608 may be available after analyzing the correlation test result. As an example of X-Y analysis, if X is not related to historical heavy load or overload outcome Y, there is no need to include X in the final analysis for pre-warning, X is removed 1606 from the group. Otherwise, X may be included. An the example of X-X analysis, if a predictor variable X is highly related to another predictor variable X, there is no need to keep two related variable in the initial group, and one of X is removed 1610. If there are multiple related Xs, only one is picked 1612.

The additional procedures may be needed after the initial predictor variables are determined. For example, modeling and testing 1622 may be performed with an initial group of predictor variables by using step-wise fitting to get a combination of Xs 1614. If the result shows the modeling and testing 1622 is passed, the predictor variables may be kept as the final group for generating pre-warnings. However, if the test fails, to the system can change variable combination 1616, for example, replacing a predictor variable X11 with a highly related variable X12 that was removed after the correlation test 1610. The modeling & testing 1622 is conducted again by the system after the replacement. If the testing fails, the system can change parameter(s) and recalculate variables 1618. The procedure may be repeated by the system with newly designed variables 1620. Finally, the modeling may fail 1624 if all testing fails.

As shown in the example of Table 6, three predictor variables can be selected from the 35 variables for the tuned short-term heavy load and overload pre-warning models in the studied area. In this example, the combination of the three variables stays unchanged for pre-warnings for each week throughout a summer peak period.

TABLE 6

THE PREDICTOR VARIABLES SELECTED IN THE TURNED MODELS

| Predictor variable | Description |
|---|---|
| HIS_MAX_SD | The standard deviation of maximum daily load in summer peak period of last year. |
| HIS_WX_COEF | The coefficient of the linear model between maximum daily load and maximum daily temperature in summer peak period of last year. |

TABLE 6-continued

| THE PREDICTOR VARIABLES SELECTED IN THE TURNED MODELS | |
|---|---|
| Predictor variable | Description |
| WEEK4_RPRE_TOP4 | The average of top 4 predicted maximum daily load in P.U. using local regression sub-models built by the data of the last three weeks |

Figure 17:
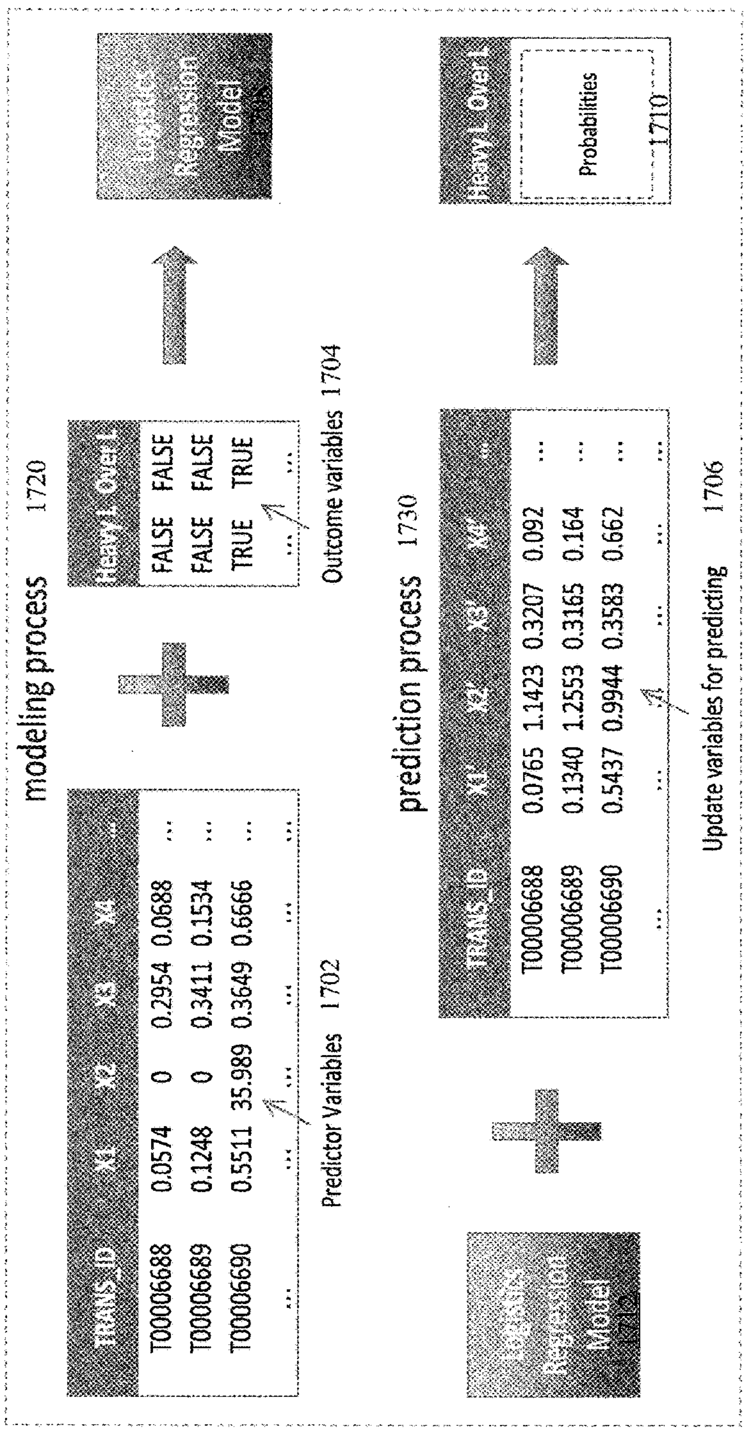
FIG. 17 shows an example of modeling and predicting process.

FIG. 17 shows an example of modeling and predicting process performed by the system. As shown in FIG. 17, the modeling process 1720 can be used to feed predictor variables 1702 and the historical heavy load and/or overload outcomes to a logistics regression model. In an embodiment, logistic regression may be applied as the main classification algorithm to predict the heavy load and overload transformers in the future. The prepared variables can be selected and tested before and during the modeling process. Then after the model is built, the predictor variables may be updated by shifting the data time window for prediction.

The logistics regression model may be replaced by other methods such as: Random forest, Support Vector Machine, SVM, Decision tree, or neural network in other embodiments. The prediction process 1730 may utilize the result of logistic regression model 1712 and adjust the logistics regression model result 1712 with the updated variables for predicting 1706. The update variables for prediction 1706 may be for the existing predictor variables with values from different time window or may be variables that are replaced from existing variables or may be variables added in the middle of the prediction process 1730. The forecasted probabilities of heavy load and/or overload for each distribution transformer in a predefined area 1710 may constitute the result of the prediction.

Figure 18:
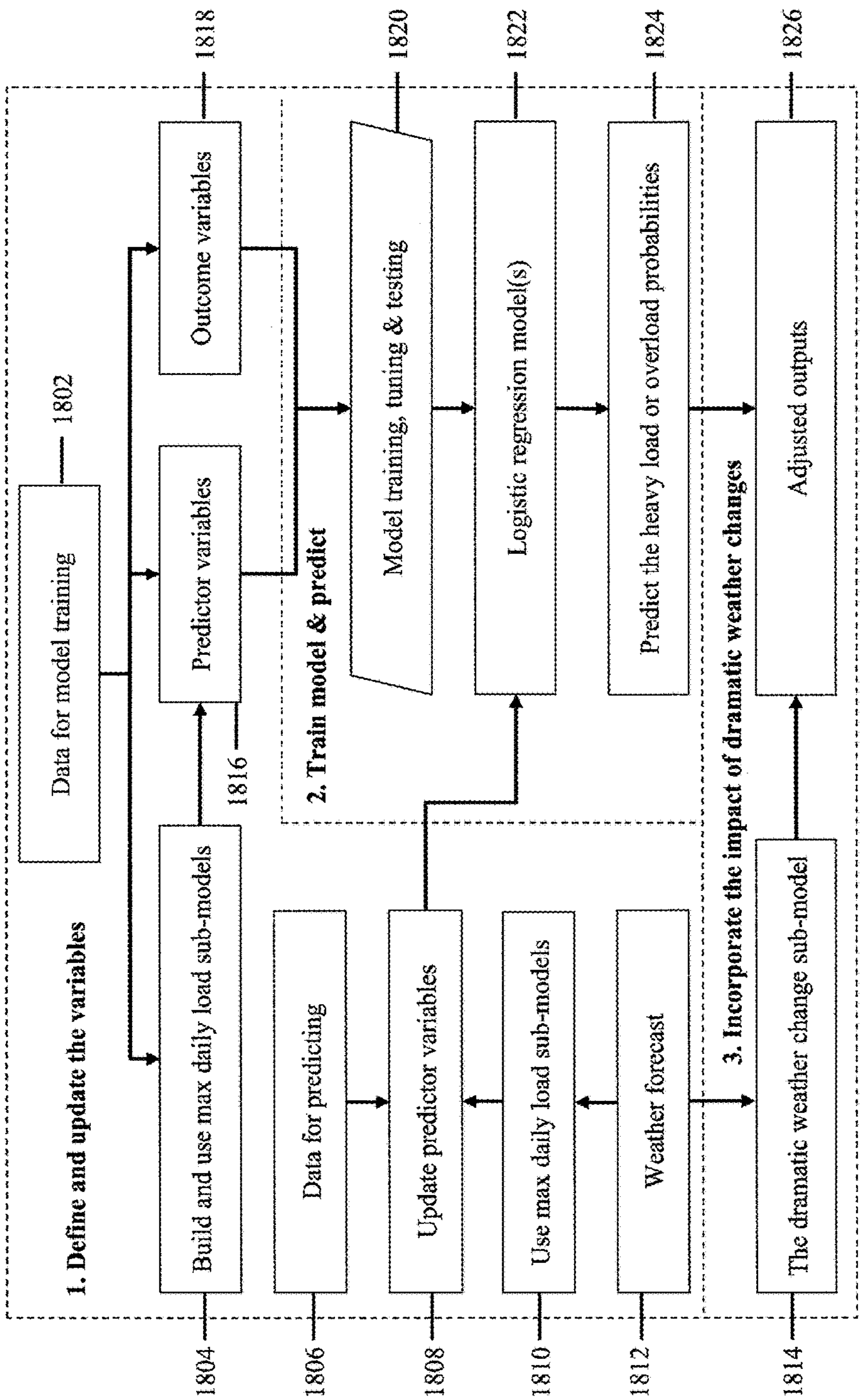
FIG. 18 shows an example of overall methodology of generating the short-term pre-warnings.

FIG. 18 shows an example of the overall methodology for generating short-term pre-warnings. Generation of the pre-warnings by the system may involve use of a classification algorithm capable of distinguishing the transformers that are susceptible to heavy load or overload in a future predetermined time period, such as a future week. The data from the related data sources may be converted into a set of predictor variables to facilitate the process of model training. The predictor variables may be generated by the system as previously discussed. Some of the predictor variables can be formulated by applying a weather forecast, such as a 7-day weather forecast into a set of sub-models that are built from the historic weather and load data to improve the model accuracy. Logistic regression may be applied as the classification algorithm to predict the heavy load and overload transformers in the future week. The prepared variables may be selected and tested before and during the modeling process. Then after the model is built, the predictor variables may be updated by shifting the data time window for prediction. It's observed from the model tuning process that if there is a dramatic weather change in the future week, the overall pre-warning results may be affected. So the methods of balancing the impact brought by the dramatic weather changes may be also performed by the system. For example, the model bias as discussed in step 150 earlier.

As shown in FIG. 18, an example of short-term pre-warning generation process may include: 1. Preparing variables, 2. Modeling training and prediction, and 3. Balancing dramatic weather changes. The preparation of variables includes data for model training 1802, build and use sub-models 1804, predictor variables 1816 and outcome variables 1818. The data for predicting 1806, predictor variables and use sub-models 1810 may also be part of the preparation of variables. After the data are prepared, the modeling training and prediction may be performed. The modeling training and predicting may include model training, tuning and testing 1820, logistic regression model(s) 1822 and heavy load or overload probabilities at a future time, such as in the next week 1824. In case the modeling result is biased, the balancing dramatic weather change section may include number forecast by another sub-model 1814 and adjust results 1826.

Figure 19:
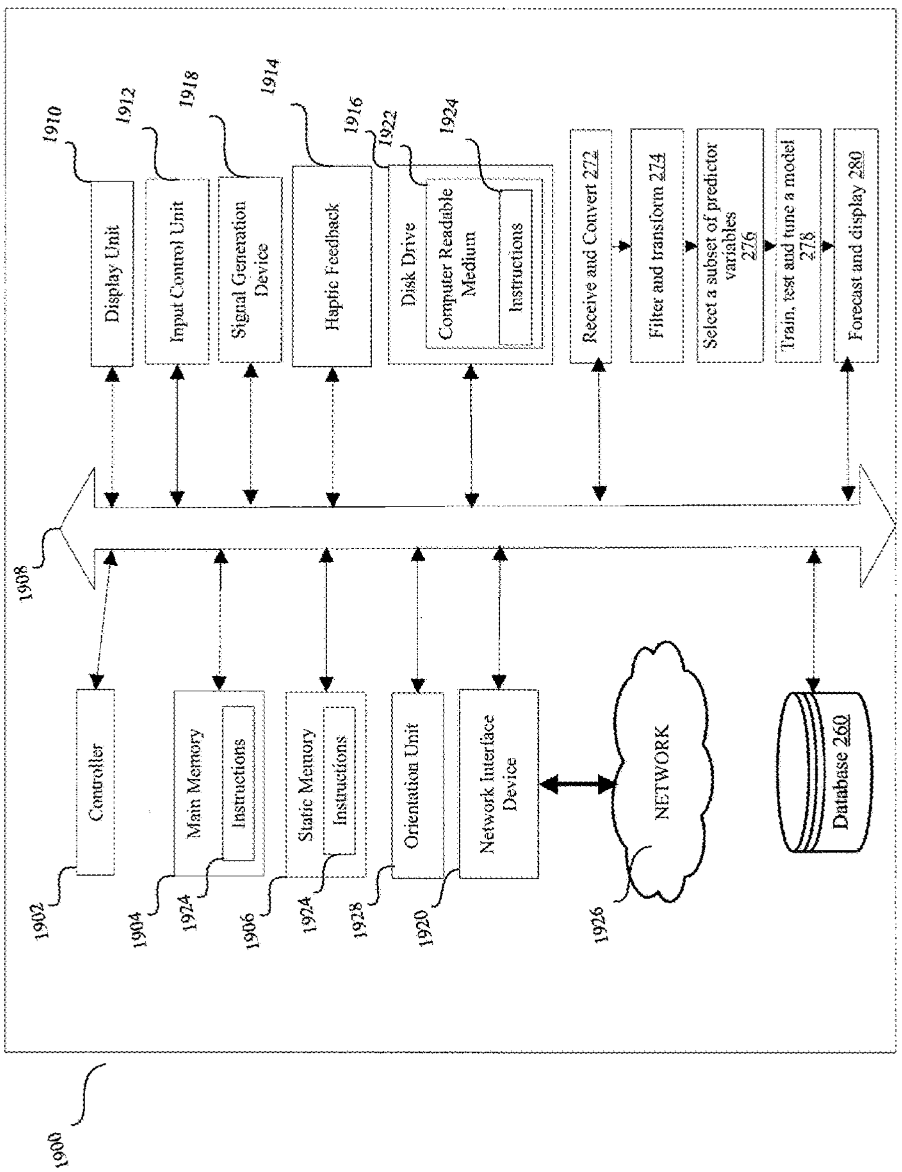
FIG. 19 illustrative embodiment of a power distribution transformer loading analysis system.

Referring to FIG. 19, an illustrative embodiment of a power distribution transformer loading analysis system 1900 is depicted. Although the power distribution transformer loading analysis system 1900 is illustrated in FIG. 19 as including all of the components as illustrated, it is within the scope of this innovation for the system to be comprised of fewer, or more, components than illustrated in FIG. 19.

The system 1900 can include a set of instructions 1924 that can be executed to cause the system 1900 to perform any one or more of the methods, processes or computer-based functions disclosed herein. For example, modules to receive and convert 272, filter and transform 274, select a subset of predictor variables 277, train, test and tune a model and forecast and display 280 as shown in FIG. 2 are also illustrate in FIG. 19. One or more programs may be stored in whole, or in any combination of parts, on one or more of the exemplary memory components illustrated in FIG. 19, such as the main memory 1904, static memory 1906, or disk drive 1916.

As described, the system 1900 may be included in a mobile device. The system 1900 may also be connected using a network 1918, to other systems or peripheral devices. In a networked deployment, the system 1900 may include operation in the capacity of a server or as a client user computer in a server-client user network environment, or as a peer computer system in a peer-to-peer (or distributed) network environment. In addition to embodiments in which the system 1900 is implemented, the system 1900 may also include, and/or be incorporated into, various devices, such as a personal computer ("PC"), a tablet PC, a set-top box ("STB"), a personal digital assistant ("PDA"), a mobile device such as a smart phone or tablet, a palmtop computer, a laptop computer, a desktop computer, a network router, switch or bridge, or any other machine capable of executing a set of instructions (sequential or otherwise) that specify actions to be taken by that machine. In a particular embodiment, the system 1900 can be implemented to include electronic devices that provide voice, video or data communication. Further, while a single system 1900 is illustrated, the term "system" shall also be taken to include any collection of systems or sub-systems that individually or jointly execute a set, or multiple sets, of instructions to perform one or more computer functions.

As illustrated in FIG. 19, the system 1900 may include a controller 1902, such as a central processing unit ("CPU"), a graphics processing unit ("GPU"), or both. Moreover, the system 1900 can include a main memory 1904, and additionally may include a static memory 1906. In embodiments where more than one memory components are included in the system 1900, the memory components can communicate with each other via a bus 1908. As shown, the system 1900 may further include a display unit 1910, such as a liquid crystal display ("LCD"), an organic light emitting diode ("OLED"), a flat panel display, a solid state display, or a cathode ray tube ("CRT"). Additionally, the system 1900 may include one or more input devices 1912, such as a keyboard, push button(s), scroll wheel, digital camera for image capture and/or visual command recognition, touch screen, touchpad or audio input device (e.g., microphone). The system 1900 can also include signal outputting components such as a haptic feedback component 1914 and a signal generation device 1918 that may include a speaker or remote control.

Although not specifically illustrated, the system 1900 may additionally include a GPS (Global Positioning System) component for identifying a location of the system 1900.

Additionally, the system 1900 may include an orientation unit 1928 that includes any combination of one or more gyroscope(s) and accelerometer(s).

The system 1900 may also include a network interface device 1920 to allow the system 1900 to communicate via wireless, or wired, communication channels with other devices. The network interface device 1920 may be an interface for communicating with another system via a Wi-Fi connection, Bluetooth connection, Near Frequency Communication connection, telecommunications connection, internet connection, wired Ethernet connection, or the like. The system 1900 may also optionally include a disk drive unit 1916 for accepting a computer readable medium 1922. The computer readable medium 1922 may include a set of instructions that are executable by the controller 1902, and/or the computer readable medium 1922 may be utilized by the system 1900 as additional memory storage.

In a particular embodiment, as depicted in FIG. 19, the disk drive unit 1916 may include a computer-readable medium 1922 in which one or more sets of instructions 1924, such as software, can be embedded. Further, the instructions 1924 may embody one or more of the methods, processes, or logic as described herein. In a particular embodiment, the instructions 1924 may reside completely, or at least partially, within the main memory 1904, the static memory 1906, and/or within the controller 1902 during execution by the system 1900. The main memory 1904 and the controller 1902 also may include computer-readable media.

In an alternative embodiment, dedicated hardware implementations, including application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system 1900 may encompass software, firmware, and hardware implementations.

In accordance with various embodiments of the present disclosure, the methods described herein may be implemented at least partially by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 1922 that includes instructions 1924 or receives and executes instructions 1924 responsive to a propagated signal; so that a device connected to a network 1918 can communicate voice, video or data over the network 1818. Further, the instructions 1924 may be transmitted or received over the network 1818 via the network interface device 1920.

While the computer-readable medium 1924 is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing, encoding or carrying a set of instructions for execution by a processor or that cause a computer system to perform any one or more of the methods or operations disclosed herein.

In a particular non-limiting, exemplary embodiment, the computer-readable medium 1922 can include a solid-state memory such as a memory card or other package that houses one or more non-volatile read-only memories, such as flash memory. Further, the computer-readable medium 1922 can be a random access memory or other volatile re-writable memory. Additionally, the computer-readable medium 1922 can include a magneto-optical or optical medium, such as a disk or tapes or other storage device to capture information communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium 1922 or a distribution medium and other equivalents and successor media, in which data or instructions may be stored. The computer readable medium is other than transitory.

Although the present specification describes components and functions that may be implemented in particular embodiments with reference to particular standards and protocols commonly used by financial institutions, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It is to be understood that, all examples provided above are merely some of the preferred examples of the present disclosure. For one skilled in the art, the present disclosure is intended to cover various modifications and equivalent arrangements included within the principle of the disclosure.

The invention claimed is:

1. A method, comprising:

selecting, with a processor, data records received from a plurality of data sources, the data records comprising electric power usage related information, wherein at least some of the data records are in a plurality of different data formats;

converting the data records in the plurality of different data formats into a pre-defined data format and populating a database with the converted data records using the processor;

filtering, with the processor, the data records in the database by using a predetermined criterion and matching each of the filtered data records with one of a plurality of distribution transformers;

generating values for a plurality of predictor variables from electric power usage information included in a plurality of the matched data records according to a set of pre-designed methods, representing the electric power usage information from a plurality of the matched data records with a respective one of the predictor variables to reduce a data record volume;

selecting, with the processor, a subset of the plurality of predefined predictor variables, wherein the predictor variables are selected according to a correlation test result;

training, testing and tuning a model based on the values of the selected subset of predictor variables and a subset of matched data records;

forecasting at least one of heavy load or overload for each of the plurality of distribution transformers in a predetermined region based on the model to provide the heavy load pre-warning or the overload pre-warning for the distribution transformers in the predetermined region; and displaying the forecasted heavy load or overload for the plurality of distribution transformers in a user interface for upgrading the distribution transformers and/or generating a system alert for the distribution transformers.

2. The method of claim 1, further comprising:

retrieving, with the processor, historical predictor variable values from the database for the selected subset of predefined predictor variables, wherein the retrieved historical predictor variable values are used for forecasting the at least one of heavy load or overload for each of the plurality of distribution transformers.

3. The method of claim 1, wherein the data records comprises transformer load data comprising Advanced Metering Infrastructure (AMI) data, weather data, user data and equipment data.

4. The method of claim 1, wherein the predetermined criterion comprises at least one of: a valid key value, a data matching verification, a percentage of valid daily load data, or a daily load validity.

5. The method of claim 1, wherein the predictor variables are designed to represent a pattern for the heavy load or overload of the distribution transformers.

6. The method of claim 1, wherein training, testing and tuning the model comprises:

training the model by using a logistic regression, wherein the logistic regression comprises selecting a subset of predictor variables for a time window.

7. The method of claim 1, wherein the pre-warning comprises:

a short-term pre-warning, wherein, in response to a rapid weather change, the short-term pre-warning comprises at least one of:

selecting a similar past weather condition; and predicting a total number of heavy load/overload transformers in an area and determining a cut-off point for predicted probabilities.

8. A device to provide a heavy load pre-warning or an overload pre-warning for distribution transformers, comprising: a processor;

a transceiver in communication with the processor, the transceiver configured to receive data records from a plurality of data feeds, the data records comprising electric power usage related information, wherein at least some of the data records are in a plurality of different data formats;

a database stored in a non-transitory memory in communication with the processor, the processor configured to convert the data records in the plurality of different data formats into a pre-defined data format and populate the database with the converted data records;

the processor further configured to filter the data records in the database in accordance with a predetermined condition, and associate each of the converted data records with one of a plurality of distribution transformers;

the processor further configured to generate values for a plurality of predefined predictor variables from the matched data records according to a set of pre-designed methods;

the processor further configured to represent electric power usage information from a plurality of the matched data records with a respective one of the plurality of predefined predictor variables to reduce a data record volume;

the processor further configured to select a subset of the plurality of predefined predictor variables, wherein the predictor variables in the selected subset are selected according to a correlation test result;

the processor further configured to train, test and tune a model based on the values of the selected subset of predictor variables and a subset of matched data records;

the processor further configured to forecast at least one of heavy load or overload for each of the plurality of distribution transformers in a predetermined region based on the model, the model used by the processor to forecast the heavy load pre-warning or the overload pre-warning for the distribution transformers in the predetermined region; and the processor further configured to display the forecasted heavy load or overload for the plurality of distribution transformers in a user interface for upgrading the distribution transformers and/or generating a system alert for the distribution transformers.

9. The device of claim 8, wherein the processor is further configured to: retrieve historical predictor variable values from the database for the selected subset of predefined predictor variables, wherein the retrieved historical predictor variable values are used for forecasting the at least one of heavy load or overload for each of the plurality of distribution transformers.

10. The device of claim 8, wherein the predetermined condition comprises at least one of:

a valid key data value, a data matching verification, a percentage of valid daily load data, or a daily load validity.

11. The device of claim 8, wherein the predictor variables are designed to represent a pattern for the heavy load or overload of the distribution transformers.

12. The device of claim 8, wherein, in response to training, testing and tuning the model, the processor is further configured to train the model by using a logistic regression, wherein the logistic regression comprises instructions stored in the memory which are executable by the processor to perform at least one of:

selection of a similar history weather condition; and determine a cut-off point for a dramatic weather change.

13. The device of claim 8, wherein the heavy load pre-warning or the overload pre-warning comprises a short-term pre-warning, wherein, in response to a dramatic weather change, the processor is further configured to generate a short-term pre-warning report based on at least one of: a similar historical weather condition selected by the processor; or determination, by the processor, of a cut-off point for the dramatic weather change.

14. A system for providing a heavy load pre-warning or an overload pre-warning for distribution transformers, comprising:

at least one processor, a non-transitory computer readable medium comprising, instructions executable by the processor to receive data records from a plurality of data feeds, the data records comprising electric power usage related information, wherein at least some of the data records are in a plurality of different data layouts;

instructions executable by the processor to convert the data records in the plurality of different data layouts into a pre-defined data layout and populate a database with the converted data records;

instructions executable by the processor to filter the data records in the database by using a predetermined condition and associate each of the converted data records with one of a plurality of distribution transformers;

instructions executable by the processor generate values of the predictor variables from the matched data records according to a set of pre-designed methods;

instructions executable by the processor to represent electric power usage information from a plurality of the matched data records with a respective one of the plurality of predefined predictor variables to decrease a data record volume;

instructions executable by the processor to select a subset of the plurality of predefined predictor variables, wherein the predictor variables in the selected subset are selected according to a correlation test result;

instructions executable by the processor to train, test and tune a model based on the values of the selected subset of predictor variables and a subset of matched data records;

instructions executable with the processor to forecast at least one of heavy load or overload for each of the plurality of distribution transformers in a predetermined geographic region based on the model for providing the heavy load pre-warning or the overload pre-warning for the distribution transformers in the predetermined geographic region; and instructions executable with the processor to display the forecasted heavy load or overload for the plurality of distribution transformers in a user interface for upgrading the distribution transformers and/or generating a system alert for the distribution transformers.

15. The system of claim 14, wherein the computer readable medium further comprises:

instructions executable by the processor to retrieve historical predictor variable values from the database for the selected subset of predefined predictor variables, wherein the retrieved historical predictor variable values are used for forecasting the at least one of heavy load or overload for each of the plurality of distribution transformers.

16. The system of claim 14, wherein the data records comprise transformer load data (AMI data), weather data, user data and equipment data.

17. The system of claim 14, wherein the predetermined condition comprises at least one of:

a valid key data value, a data matching determination, a percentage of valid daily load data, or a daily load validity.

18. The system of claim 14, wherein the predictor variables are designed to represent a pattern for the heavy load or overload of the distribution transformers.

19. The system of claim 14, wherein, the instructions executable by the processor to train, test and tune the model further comprise:

instructions executable by the processor to train the model using a logistic regression, wherein the logistic regression comprises the instructions to select a subset of predictor variables for a time window.

20. The system of claim 14, wherein the pre-warning comprises instructions to provide:

a short-term pre-warning, wherein, in response to a dramatic weather change, the instructions to provide the short-term pre-warning comprises instructions to perform at least one of:

select a similar history weather condition; and predict a total number of heavy load/overload transformers in an area and determine a cut-off point for predicted probabilities.

* * * * *